United States Patent
Patil et al.

(10) Patent No.: US 12,371,605 B2
(45) Date of Patent: Jul. 29, 2025

(54) THIXOTROPIC CEMENT SLURRY WITH GRAPHENE OXIDE

(71) Applicant: Halliburton Energy Services, Inc., Houston, TX (US)

(72) Inventors: Sandip Prabhakar Patil, Pune (IN); Sourav Ghosh, Pune (IN); Gauri Sudhir Bhide, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/511,187

(22) Filed: Nov. 16, 2023

(65) Prior Publication Data

US 2025/0163311 A1 May 22, 2025

(51) Int. Cl.
| | | |
|---|---|---|
| *C09K 8/504* | (2006.01) | |
| *C04B 14/02* | (2006.01) | |
| *C04B 14/10* | (2006.01) | |
| *C04B 18/14* | (2006.01) | |
| *C04B 24/38* | (2006.01) | |

(Continued)

(52) U.S. Cl.
CPC .......... *C09K 8/5045* (2013.01); *C04B 14/022* (2013.01); *C04B 14/10* (2013.01); *C04B 18/146* (2013.01); *C04B 24/38* (2013.01); *C04B 28/02* (2013.01); *E21B 21/003* (2013.01); *E21B 33/138* (2013.01); *C04B 2201/50* (2013.01)

(58) Field of Classification Search
None
See application file for complete search history.

(56) References Cited

U.S. PATENT DOCUMENTS

| | | | | | |
|---|---|---|---|---|---|
| 4,500,357 | A | * | 2/1985 | Brothers | ............. C04B 24/2688 524/5 |
| 11,739,247 | B1 | * | 8/2023 | Boul | ...................... C04B 28/04 166/292 |

(Continued)

FOREIGN PATENT DOCUMENTS

| | | | | | |
|---|---|---|---|---|---|
| WO | WO 2023056002 | * | 4/2023 | ............... | C09K 8/42 |
| WO | 2023056002 A2 | | 6/2023 | | |
| WO | 2023168263 A1 | | 9/2023 | | |

OTHER PUBLICATIONS

Foreign Communication from Related Application—International Search Report and Written Opinion of the International Searching Authority, International Application No. PCT/US2023/081877, dated Aug. 12, 2024 12 pages.

(Continued)

*Primary Examiner* — Anuradha Ahuja
(74) *Attorney, Agent, or Firm* — Conley Rose, P.C.; Rodney B. Carroll

(57) ABSTRACT

A method of servicing a wellbore penetrating a subterranean formation with a thixotropic cement composition is provided. The thixotropic cement composition includes a cementitious material, silica fume, graphene oxide, and an aqueous fluid, can have a 10-minute gel strength of from about 20 lbf/100 ft$^2$ to about 300 lbf/100 ft$^2$, and can be used to service a wellbore (e.g., to reduce lost circulation in the wellbore). By incorporating graphene oxide into the thixotropic cement composition, the thixotropic cement composition can have a higher 10-minute gel strength than a reference composition absent the graphene oxide.

15 Claims, 6 Drawing Sheets

(51) Int. Cl.
   *C04B 28/02* (2006.01)
   *E21B 21/00* (2006.01)
   *E21B 33/138* (2006.01)

(56) References Cited

U.S. PATENT DOCUMENTS

| | | |
|---|---|---|
| 2016/0258269 A1* | 9/2016 | Musso ................ G01L 1/18 |
| 2017/0015890 A1 | 1/2017 | De Stefano et al. |
| 2018/0072938 A1 | 3/2018 | Mazyar et al. |
| 2019/0241472 A1 | 8/2019 | Kondratowicz et al. |
| 2023/0279283 A1 | 7/2023 | Pang et al. |

OTHER PUBLICATIONS

Li, X. et al., "Incorporation of graphene oxide and silica fume into cement paste: A study of dispersion and compressive strength", Construction and Building Materials, Jul. 15, 2016, vol. 123, pp. 327-335 abstract; pp. 328-334; table 4.

Felipe Basquiroto De Souza et al., Controlled growth and ordering of poorly-crystalline calcium-silicate-hydrate nanosheets. Communications Materials | https://doi.org/10.1038/s43246-021-00191-64 Communications. 11 pages.

\* cited by examiner

THIXOTROPIC CEMENT SLURRY WITH GRAPHENE OXIDE

FIELD

This application relates to a composition, and more specifically this application relates to a thixotropic cement composition that can be utilized, for example, in the recovery of natural resources from a wellbore penetrating a subterranean formation.

BACKGROUND

This disclosure relates generally to a method of treating a wellbore penetrating a subterranean formation, and cement compositions to utilize in such methods. More specifically, it relates to methods of making and using a thixotropic cement composition, and such a composition, for treating a wellbore penetrating a subterranean formation, for example treating a lost circulation zone in the wellbore.

Hydrocarbons, such as oil and gas, residing in a subterranean formation or zone are usually recovered by drilling a wellbore down to the subterranean formation while circulating a drilling fluid in the wellbore. The drilling fluid is usually circulated downward through the interior of the drill pipe and upward through the annulus, which is located between the exterior of the drill pipe and the interior wall of the wellbore. Wellbores can pass through a number of zones within a subterranean formation other than the particular hydrocarbon zones of interest. In various scenarios, fluid in a wellbore may communicate with fluid in the subterranean formation around the wellbore. In one scenario, fluids used in servicing a wellbore (e.g., a drilling fluid) may be lost to the subterranean formation while circulating the fluids in the wellbore. In particular, the fluids may enter the subterranean formation via lost circulation zones, for example, depleted zones, zones of relatively low pressure, zones having naturally-occurring fractures, weak zones having fracture gradients exceeded by the hydrostatic pressure of the wellbore servicing fluid (e.g., a drilling fluid), and so forth. As a result, the service provided by such wellbore servicing fluid is more difficult to achieve. A composition with fluid loss control property can be introduced in the above scenarios to reduce and eventually prevent the undesired fluid communication between the wellbore and the subterranean formation surrounding the wellbore.

To be more effective in certain applications, such as lost circulation control described above, the cement composition can ideally be thixotropic, maintaining a low viscosity while under shear, but, when allowed to remain static, the wellbore servicing fluid can develop gel strength quickly with the ability to thin and flow when shear is re-applied. Rapid development of compressive strength can also be desired after placement, for example into a lost circulation zone.

Accordingly, an ongoing need exists for thixotropic cement compositions.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
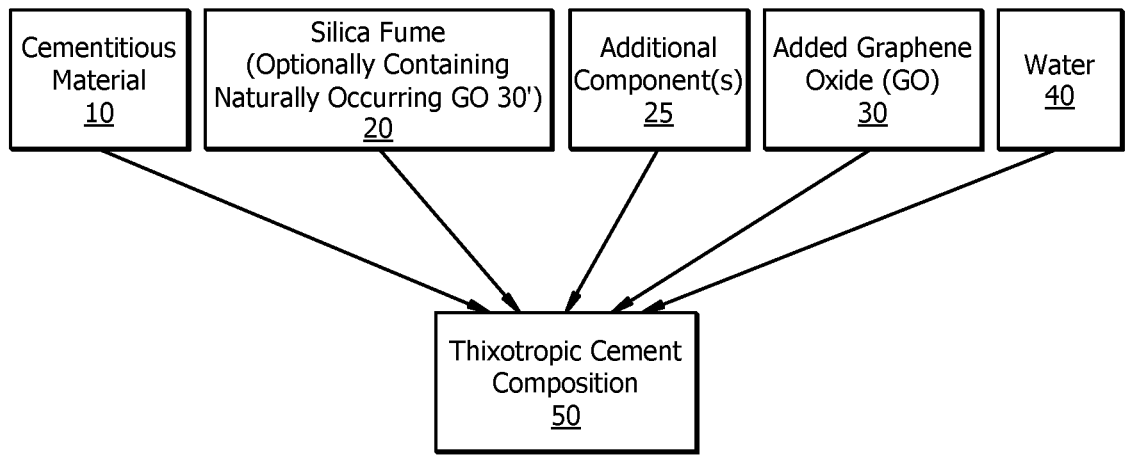
FIG. 1 is a schematic representation of a thixotropic cement composition (TCC), according to embodiments of this disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Via this disclosure, silica fume is utilized to impart thixotropic behavior to a cement composition (e.g., a cement slurry). As silica fume is conventionally produced as a byproduct during manufacturing of silicone and ferrosilicon alloy, silica fume quality can vary from source to source. Variation in silica fume obtained from different sources can directly impact the thixotropic behavior of a resulting cement slurry (e.g., a cement composition) comprising the silica fume. Via this disclosure, graphene oxide can be utilized to further impact the thixotropic behavior of a cement composition comprising silica fume. Addition of graphene oxide can be utilized to minimize variation in gel strength build up caused by variation in quality of (e.g., amount of naturally-occurring graphene oxide in) available silica fume.

This disclosure provides a thixotropic cement composition that can be utilized in a wellbore servicing operation, for example and without limitation, as a lost circulation fluid (also referred to as a fluid loss control fluid), which can reduce or prevent undesired fluid communication between a wellbore and subterranean formation surrounding the wellbore. The methods disclosed herein involves making and using this thixotropic cement composition for servicing a wellbore penetrating a subterranean formation, for example, utilizing the herein disclosed thixotropic cement composition as a lost circulation fluid.

Being thixotropic means having a property of thixotropy, which is a time-dependent shear thinning property. When a stress is applied (being shaken, agitated, sheared, pumped, or otherwise stressed) to a thixotropic fluid (e.g., the thixotropic cement composition), viscosity of the thixotropic fluid decreases and the thixotropic fluid becomes thin and less viscous over time; after the stress stops, viscosity of the thixotropic fluid increases and it will take a finite time for the thixotropic fluid to return to a viscous state. In embodiments, the thixotropic cement composition is effectively thixotropic to be pumped downhole, and upon cessation of the pumping the thixotropic cement composition exhibits increasing gel strength to set.

Description of a system and method of this disclosure will now be made with reference to FIG. 1, which is a schematic representation of a thixotropic cement composition (TCC) 50, according to embodiments of this disclosure, and FIG. 2, which is a schematic flow diagram of a method 100, according to embodiments of this disclosure.

Figure 2:
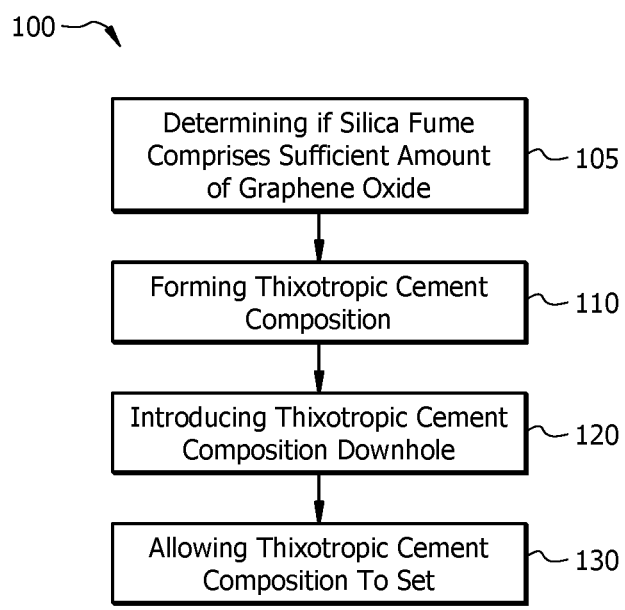
FIG. 2 is a schematic flow diagram of a method, according to embodiments of this disclosure.

As depicted in FIG. 1, according to this disclosure, a thixotropic cement composition 50 comprises: a cementitious material 10, silica fume 20, graphene oxide (e.g., added graphene oxide 30 and/or naturally-occurring graphene oxide 30' in silica fume 20, as detailed further hereinbelow), and an aqueous fluid 40. The silica fume 20 may or may not itself comprise graphene oxide 30', which will be referred to herein as "naturally-occurring graphene oxide" 30'. The thixotropic cement composition 50 comprises an amount of the graphene oxide (e.g., a total amount of graphene oxide, e.g., percent graphene oxide by weight of cement (% bwoc)) that is greater than any amount in (e.g., inherent to, a naturally-occurring component of) the silica fume 20. The added graphene oxide 30 is thus an amount of graphene oxide that can be in the TCC 50 in addition to any graphene oxide 30' in (e.g., inherent to, a component of) the silica fume 20. The thixotropic cement composition 50 thus comprises a total amount of graphene oxide $A_{G.O., TOT}$, including a first amount X of graphene oxide, wherein the first amount X of graphene oxide comprises an amount of the added graphene oxide 30, plus a second amount Y of graphene oxide, wherein the second amount Y of graphene oxide comprises any amount Y of naturally-occurring graphene oxide 30' in (e.g., inherent to, a natural component of) the silica fume 20. Thus, $A_{G.O., TOT}$=X+Y.

In embodiments, thixotropic cement composition 50 comprises a total amount of graphene oxide $A_{G.O., TOT}$ in a range of from about 0.1, 0.2, 0.3, 0.4, 0.5, 0.6, 0.7, 0.8, 0.9, or 1.0 to about 1, 2, 3, 4, or 5 percent by weight of cement (% bwoc). In embodiments, thixotropic cement composition 50 comprises a total amount of graphene oxide $A_{G.O., TOT}$ in a range of from about 0.1, 0.2, 0.3, 0.4, 0.5, 0.6, 0.7, 0.8, 0.9, or 1.0 to about 1, 2, 3, 4, or 5 percent by weight of TCC 50. In embodiments, the second amount Y of graphene oxide (i.e., an amount Y of graphene oxide in the silica fume 20) in TCC 50 is not zero, and silica fume 20 itself contains (e.g., naturally-occurring) graphene oxide 30'. In embodiments, the second amount Y of graphene oxide (i.e., the amount Y of naturally-occurring graphene oxide 30' in the silica fume 20) in the TCC 50 is about zero, and silica fume 20 itself comprises no naturally-occurring graphene oxide 30'.

The thixotropic cement composition 50 can comprise a cementitious material 10, silica fume 20, naturally-occurring graphene oxide 30' provided with the silica fume 20 and/or, in embodiments, added graphene oxide 30 included as a disparate component of the TCC 50 (e.g., the total amount of graphene oxide $A_{G.O., TOT}$ can include an amount Y of naturally-occurring graphene oxide 30' in the silica fume 20 and/or an amount X of added graphene oxide 30), and an aqueous fluid (e.g., water) 40.

In embodiments, as noted hereinabove, the thixotropic cement composition 50 comprises a cementitious material 10. The cementitious material 10 can comprise calcium, aluminum, silicon, oxygen, iron, and/or sulfur. The cementitious material 10 can comprise Portland cement, pozzolana cement, gypsum cement, shale cement, acid/base cement, phosphate cement, high alumina content cement, slag cement, silica cement, high alkalinity cement, magnesia cement, or a combination thereof. In embodiments, "high alumina content cement" refers to a cement having an alumina concentration in the range of from about 40 wt. % to about 80 wt. % by a weight of the high alumina content cement. In embodiments, "high alkalinity cement" refers to a cement having a sodium oxide concentration in the range of from about 1.0 wt. % to about 2.0 wt. % by a weight of the high alkalinity cement.

Portland cements that are suited for use in the disclosed thixotropic cementitious composition 50 include, but are not limited to, Class A, C, G, H, low sulfate resistant cements, medium sulfate resistant cements, high sulfate resistant cements, or combinations thereof. The class A, C, G, and H cements are classified according to API Specification 10. Additional examples of Portland cements suitable for use in the present disclose include, without limitation, those classified as ASTM Type I, II, III, IV, or V. In embodiments, the cementitious material comprises a Class G cement, a Class H cement, a Class A cement, a Class C cement, or combinations thereof.

The cementitious material 10 can be present in the thixotropic cement composition 50 in an amount of from about 0.01 wt. % to about 90 wt. % based on the total weight of the thixotropic cement composition 50, alternatively from about 0.01 wt. % to about 75 wt. %, alternatively from about 0.01 wt. % to about 50 wt. %, or alternatively from about 0.04 wt. % to about 25 wt. %.

As referred to herein, the term "silica fume" will be utilized interchangeably with "amorphous silica" to refer to non-crystalline silica. Silica fume has been assigned CAS Number 69012-64-2. The silica fume 20 can comprise an ultrafine material comprising spherical particles, for example, spherical particles with a diameter of less than about 1 micrometer (μm) (e.g., an average diameter of less than or equal to about 150 nanometers (nm)).

Silica fume, also known as microsilica, is an ultrafine amorphous silica powder, primarily composed of silicon dioxide ($SiO_2$). It is a byproduct of the production of silicon or ferrosilicon in high-temperature electric arc furnaces. Owing to its extremely fine particle size and high silica content, silica fume can provide a range of beneficial properties when used as an additive in cementitious mixtures, including enhancing strength, durability, and reducing permeability.

Silica fume 20 can be produced via the following, or a disparate, process: (1) raw material melting: silicon (Si) or ferrosilicon (FeSi) can be produced by reducing quartz ($SiO_2$) in the presence of carbon in an electric arc furnace; this reaction releases substantial amounts of heat, potentially raising temperatures up to about 2,000° C.; (2) gas collection: during the reduction process, silicon dioxide vapor can form as a result of the high temperatures; this silicon dioxide vapor can exit the furnace; (3) particle formation: as the $SiO_2$ vapor exits the furnace and cools, it can condense and form fine amorphous silica particles; these fine amorphous silica particles can be entrained in the furnace exhaust gases; (4) gas cleaning: the furnace exhaust gases containing the fine amorphous silica particles can be passed through a gas cleaning system, such as a bag house filter, wherein the silica fume can be separated from the gases and collected; (5) processing and packaging: once collected, the silica fume can be further processed, for example to adjust its bulk density (e.g., densification), and subsequently packaged in bags or other suitable containers for distribution and/or sale. As noted herein, such or other production methods for providing silica fume 20 can result in product silica fumes having varied composition, which can affect the properties of a cement composition containing the silica fume.

When added to cementitious compositions, silica fume can provide several benefits, including one or more of: (1) increased strength: silica fume can significantly enhance the compressive, flexural, and tensile strength of hardened cement; (2) durability: cement with silica fume can exhibit increased resistance to common issues such as freeze-thaw cycles, alkali-silica reaction, chloride penetration, and sulfate attacks; (3) reduced permeability: adding silica fume can reduce the permeability of hardened cement, making it more impervious to water and aggressive agents, thus enhancing its durability; and/or (4) improved workability: when combined with plasticizers, silica fume can improve the workability of fresh cement compositions.

Thixotropic cement composition 50 comprises amorphous silica or silica fume 20. Among other things, the amorphous silica may impart viscosity to the thixotropic cement composition 50. In general, amorphous silica is a high surface area, non-crystalline form of silica. An example of a suitable amorphous silica is Silicalite™ cement additive, available from Halliburton Energy Services, Inc. The amorphous silica 20 may be present in the thixotropic cement composition 50 in an amount of from about 0.001 wt. % to about 50 wt. % based on the total weight of the thixotropic cement composition 50, alternatively from about 0.01 wt. % to about 50 wt. %, alternatively from about 0.01 wt. % to about 40 wt. %, alternatively from about 0.01 wt. % to about 30 wt. %, or alternatively from about 0.1 wt. % to about 20 wt. %. One of ordinary skill in the art, with the benefit of this disclosure, will recognize the appropriate amount of the amorphous silica 20 to include for a chosen application.

In embodiments, the silica fume 20 comprises (e.g., provides) the thixotropic cement composition 50 less than or equal to about 0.1, 0.2, 0.3, 0.4, or 0.5 percent graphene oxide (e.g., by weight of cement (% bwoc)) (e.g., as determined by rheology studies of the thixotropic cement composition absent the added graphene oxide 30, Raman spectroscopy, or a combination thereof, as detailed further hereinbelow).

Graphene oxide (GO) is an oxidized form of graphene, which is decorated with various oxygen-containing functional groups. At its core, graphene oxide has the same hexagonal lattice structure as graphene, which is composed of carbon atoms. However, unlike pristine graphene, GO contains oxygen-containing functional groups. These groups can include hydroxyls and epoxides on the basal plane, and carboxyl groups at the sheet edges. The presence of these functional groups disrupts the regular sp2 hybridized carbon lattice of pure graphene. Typically, graphene oxide is a single atomic layer thick, similar to graphene, with a thickness of about 0.7-1.2 nm (with additional height resulting from the functional groups). The lateral size of GO sheets can range from a few nanometers to several micrometers, depending on the synthesis and processing methods used in its formation. In solutions, GO can form flakes with dimensions of several micrometers. Due to the disruption of its sp2 bonding network by the oxygen functionalities, graphene oxide is an electrical insulator. However, its electrical properties can be partially restored by reduction to "reduced graphene oxide" (rGO). The presence of structural defects and functional groups make GO sheets less robust than pristine graphene. Due to the oxygen functionalities, GO is hydrophilic, which enable GO to readily disperse in water and some organic solvents, in stark contrast to pristine graphene which is hydrophobic.

The graphene oxide can be produced by oxidizing graphite using strong oxidants in a mixture of sulfuric acid, sodium nitrate, and potassium permanganate. This method, called the Hummers' method, has been modified over time to improve efficiency and safety. Generally, graphene oxide synthesis can begin with natural graphite as the raw material. This natural graphite can be subjected to chemical exfoliation via oxidation, leading to the formation of graphene oxide. After synthesis, GO can be processed and dispersed in water or other solvents, and can be further chemically or thermally reduced, as desired, to produce rGO.

As noted hereinabove, the layered structure of graphene oxide (GO) shares a foundational similarity to graphene, however, the introduction of various functional groups and defects brings about a complex, modified morphology. Graphene, the parent material of GO, is a two-dimensional, one-atom-thick layer of sp2-bonded carbon atoms arranged in a hexagonal lattice. Each carbon atom in graphene is bonded to three other carbons, thus forming a planar sheet. Modifications of graphene exhibited in GO include: (1) functional groups: on the basal plane (e.g., the main surface): the primary plane of GO comprises hydroxyl (—OH) and epoxide (C—O—C) groups that are typically situated on the top and bottom surfaces of the GO sheet; at the edges: the sheet edges predominantly comprise carboxyl (—COOH) and perhaps some carbonyl (C=O) groups. These edge functionalities render the edges of GO sheets more reactive relative to the basal plane; (2) distortion and defects: due to the introduction of the oxygen-containing groups, the perfect hexagonal structure of graphene is disrupted in GO and this distortion leads to a more irregular and less conjugated structure; the sp2 hybridized carbon network, which is responsible for the exceptional electrical properties of graphene, is disrupted, leading to regions of sp3 hybridized carbons where the functional groups are attached; (3) layered assembly: much like graphite, which comprises a stack of graphene sheets, GO can exist in a layered structure when multiple sheets stack atop one another, especially during drying or processing; the interlayer spacing in GO is larger than that found in graphite, due to the presence of the oxygen-containing functional groups and trapped water molecules of GO; while the spacing in graphite can be about 0.335 nm, in GO it can range between 0.6 to 1 nm, depending on the level of oxidation and the moisture content; (4) nature of interactions: the forces holding multiple GO sheets together in a layered structure comprise primarily Van der Waals forces and hydrogen bonding; hydrogen bonds can form between the oxygen functionalities of one GO sheet and the hydrogens of the functional groups on an adjacent sheet; due to the presence of the functional groups, GO sheets can also exhibit strong interactions with water, enabling the GO sheets to easily exfoliate in aqueous solutions.

The added graphene oxide 30 can be present in the thixotropic cement composition 50 in an amount of from about 0.01 wt. % to about 10 wt. % based on the total weight of the thixotropic cement composition 50, alternatively from about 0.01 wt. % to about 5 wt. %, alternatively from about 0.01 wt. % to about 2 wt. %, or alternatively from about 0.01 wt. % to about 1 wt. %. Alternatively, the total amount of graphene oxide $A_{GO,\ TOT}$ in the cement composition 50 (i.e., including first amount X of graphene oxide in added graphene oxide 30 and any naturally-occurring graphene oxide 30' in silica fume 20) can be in a range of from about 0.01 wt. % to about 10 wt. % based on the total weight of the thixotropic cement composition 50, alternatively from about 0.01 wt. % to about 5 wt. %, alternatively from about 0.01 wt. % to about 2 wt. %, or alternatively from about 0.01 wt. % to about 1 wt. %. The amount X of added graphene oxide 30 can be selected to provide a desired total amount $A_{GO,\ TOT}$ of graphene oxide in TCC 50, e.g., a total amount $A_{GO,\ TOT}$ of graphene oxide to provide gel strength in a range of from about 20 lbf/100 ft$^2$ to about 300 lbf/100 ft$^2$.

Among other things, the presence of silica fume 20 and added graphene oxide 30 in the thixotropic cement composition 50 of the present disclosure may increase the gel strength of the TCC 50 relative to an otherwise same TCC having no added GO 30 and/or a reduced total amount of graphene oxide (e.g., containing a silica fume 20 having less naturally-occurring GO 30'). In embodiments, the presence of silica fume 20 and added graphene oxide 30 in the thixotropic cement composition 50 may contribute to a viscosity appropriate for discouraging any flow of fluids into the formation (520, FIG. 5, discussed hereinbelow).

Generally, silica fume 20 and added graphene oxide 30 can be present in the thixotropic cement composition 50 of the present disclosure in an amount sufficient to provide a sufficient gel strength to and/or retard the setting of the thixotropic cement composition of the present disclosure for a desired time. The amount of silica fume 20 and added graphene oxide 30 that may be included may depend on a number of factors, including, but not limited to, the bottom hole circulating temperature of the well into which the thixotropic cement composition 50 is to be placed, the particular formulation 520 (FIG. 5, discussed hereinbelow) of the chosen silica fume 20 (e.g., the amount, if any, of naturally-occurring graphene oxide 30' therein), and the like. In embodiments, the quantity of the silica fume 20 and added graphene oxide 30 to be included in the thixotropic cement composition 50 may be determined prior to preparation of the thixotropic cement composition. For example, the quantity of the added graphene oxide 30 to be included in the thixotropic cement composition 50 may be determined by performing rheology and 10 min gel strength tests of the type described in API-RP-10B-2.

The thixotropic cement composition 50 can include an aqueous fluid 40. Generally, the aqueous fluid 40 can be from any source, provided that it does not contain an amount of components that may undesirably affect the other components (e.g., cementitious material 10, silica fume 20, graphene oxide 30) in the thixotropic cement composition 50. For example, the aqueous fluid 40 can comprise fresh water, surface water, ground water, produced water, salt water, sea water, brine (e.g., underground natural brine, formulated brine, etc.), or a combination thereof. In embodiments, the aqueous fluid 40 comprises a brine. In embodiments, the brine includes monovalent or divalent salts such as, sodium chloride, sodium bromide, potassium bromide, potassium chloride, magnesium chloride, calcium chloride, calcium bromide, potassium formate, cesium formate, lithium chloride, lithium bromide, sodium formate, lithium formate, ammonium chloride, tetramethyl ammonium chloride, choline chloride, potassium acetate, or a combination thereof. A formulated brine can be produced by dissolving one or more soluble salts in water, a natural brine, or sea water. The brine can be saturated or unsaturated.

The aqueous fluid 40 can be present in the thixotropic cement composition 50 in an amount effective to provide a pumpable slurry, such as a slurry having desired (e.g., job or service specific) rheological properties. In embodiments, the aqueous fluid 40 is present in the thixotropic cement composition 50 in an amount of from about 5 vol. % to about 99 vol. % based on the total volume of the thixotropic cement composition 50, alternatively from about 10 vol. % to about 99 vol. %, or alternatively from about 25 vol. % to about 95 vol. %.

Thixotropic cement composition 50 can further comprise one or more additional components 25. The one or more additional component(s) 25 can be present in any suitable amount. For example, generally, the one or more additional components 25 can be present in the thixotropic cement composition 50 in an amount of from about 0.01 wt. % to about 60 wt. % based on the total weight of the thixotropic cement composition 50, alternatively from about 0.01 wt. % to about 30 wt. %, alternatively from about 0.01 wt. % to about 15 wt. %, or alternatively from about 0.01 wt. % to about 5 wt. %.

By way of example, in embodiments, TCC 50 comprises an additional component(s) selected from polysaccharides, clays, or a combination thereof. In embodiments, additional component(s) 25 of a thixotropic cement composition 50 of this disclosure comprises a polysaccharide. The polysaccharide can be present in an amount of from about 0.001 to about 10, from about 0.01 to about 5, or from about 0.1 to about 2 weight percent by weight of cement (% bwoc). By way of non-limiting examples, the polysaccharide can comprise diutan gum, welan gum, xanthan gum, guar gum or a combination thereof.

In embodiments, additional component(s) 25 of a thixotropic cement composition 50 of this disclosure comprises a clay. The clay can comprise sepiolite, montmorillonite, beidellite, nontronite, samonite, smectite, kaolinite, serpentine, illite, chlorite, saponite, fuller's earth, attapulgite, or combinations thereof. The clay can be present in the thixotropic cement composition 50 in an amount of from about 0.001 wt. % to about 50 wt. % based on the total weight of the thixotropic cement composition 50, alternatively from about 0.01 wt. % to about 25 wt. %, or alternatively from about 0.1 wt. % to about 15 wt. %. The clay can be present in an amount of from about 0.001 to about 50, from about 0.01 to about 25, or from about 0.1 to about 15 percent by weight of cement (% bwoc).

The one or more additional components 25 of the thixotropic cement composition TCC 50 can comprise a viscosifier. Thus, in embodiments, the thixotropic cement composition 50 can further comprise a viscosifier, such as, but not limited to, a biopolymer, a synthetic polymer, or a combination thereof. In embodiments, the viscosifier comprises hydroxyethyl cellulose, hydroxy-propyl guar, carboxymethyl-hydroxy-propyl guar, modified polysaccharides, partially hydrolyzed polyacrylamide (PHPA), carboxy-methyl-cellulose, polyanionic cellulose, guar gum, locust bean gum, Karaya gum, gum tragacanth, hydrophobically modified guars, high-molecular weight polysaccharides composed of mannose and galactose sugars, heteropolysaccharides obtained by the fermentation of starch-derived sugars, xanthan, pectins, diutan, welan, gellan, scleroglucan, chitosan, dextran, substituted or unsubstituted galactomannans, starch, cellulose, cellulose ethers, carboxycelluloses, hydroxypropyl cellulose, carboxyalkylhydroxyethyl celluloses, carboxymethyl hydroxyethyl cellulose, methyl cellulose, sodium polyacrylate, polyacrylamide, partially hydrolyzed polyacrylamide, polymethacrylamide, poly(acrylamido-2-methyl-propane sulfonate), poly(sodium-2-acrylamide-3-propylsulfonate), copolymers of acrylamide and acrylamido-2-methyl-propane sulfonate, terpolymers of acrylamido-2-methyl-propane sulfonate, acrylamide and vinylpyrrolidone or itaconic acid, or a combination thereof.

In embodiments, the viscosifier has a number average molecular weight in a range of from about 1.2 MM Dalton (Da) to about 5 MM Da, alternatively from about 1.5 MM Da to about 4.5 MM Da, or alternatively from about 2 MM Da to about 4 MM Da.

In embodiments, the viscosifier is in the thixotropic cement composition 50 in an amount of from about 0.001 wt. % to about 10 wt. %, based on the total weight of the thixotropic cement composition, alternatively from about 0.01 wt. % to about 5 wt. %, or alternatively from about 0.1 wt. % to about 2 wt. %.

In embodiments, the thixotropic cement composition 50 further comprises one or more additives. The one or more additives can comprise weighting agents, retarders, accelerators, activators, gas control additives, lightweight additives, gas-generating additives, mechanical-property-enhancing additives, lost-circulation materials, filtration-control additives, fluid-loss-control additives, defoaming agents, foaming agents, transition time modifiers, thixotropic additives, suspending agents, acid soluble materials, or combinations thereof. The oxidative breaker can include bromate, persulfate, perborate, and perbromate, for example. With the benefit of this disclosure, one of ordinary skill in the art should be able to recognize and select one or more suitable additives for use in the thixotropic cement composition.

In embodiments, the one or more additives are present in the thixotropic cement composition 50 in an amount of from about 0.001 wt. % to about 75 wt. %, based on the total weight of the thixotropic cement composition, alternatively from about 0.1 wt. % to about 70 wt. %, or alternatively from about 1 wt. % to about 50 wt. %.

Rheology results of the thixotropic cement composition 50 can be measured. Viscosity of the thixotropic cement composition 50 can be converted from "rheology dial readings," which herein refers to dial readings on a FANN® viscometer at different rotational speeds (e.g., 300 revolutions per minute (rpm) to 3 rpm), when measured in accordance with test standard API-RP-10B-2. For example, the FANN® viscometer is rotated at 300 rpm for 10 seconds and a value on the dial is read, the speed can then be changed to another rpm and a new value on the dial reading can be taken. There are a number of theoretical models known to those of ordinary skill in the art that can be used to convert the values from the dial readings at the different rpm's into viscosity (centipoises).

In embodiments, at a speed of from about 3 rpm to about 300 rpm and atmospheric pressure, the thixotropic cement composition 50 has a rheology dial reading in a range of from about 3 to about 300, alternatively from about 3 to about 200, alternatively from about 5 to about 200, alternatively from about 5 to about 100, alternatively from about 5 to about 80, or alternatively from about 10 to about 50, when measured in accordance with test standard API-RP-10B-2.

In embodiments, at a speed of about 3 rpm, and atmospheric pressure, the thixotropic cement composition 50 has a rheology dial reading in a range of from about 3 to about 50, alternatively from about 3 to about 40, alternatively from about 5 to about 40, or alternatively from about 10 to about 35, when measured in accordance with test standard API-RP-10B-2. In embodiments, the rheology dial readings described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In embodiments, the rheology dial readings described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

The thixotropic cement composition 50 can have a 10-second gel strength of from about 5 lb/100 ft$^2$ to about 100 lb/100 ft$^2$, alternatively from about 5 lb/100 ft$^2$ to about 85 lb/100 ft$^2$, alternatively from about 5 lb/100 ft$^2$ to about 75 lb/100 ft$^2$, alternatively from about 15 lb/100 ft$^2$ to about 75 lb/100 ft$^2$, or alternatively from about 10 lb/100 ft$^2$ to about 65 lb/100 ft$^2$, when measured in accordance with test standard API-RP-10B-2. The thixotropic cement composition 50 can exhibit a 10-second gel strength of from about 5 lb/100 ft$^2$ to about 100 lb/100 ft$^2$, from about 5 lb/100 ft$^2$ to about 75 lb/100 ft$^2$, or from about 10 lb/100 ft$^2$ to about 65 lb/100 ft$^2$, when measured in accordance with test standard API-RP-10B-2.

The thixotropic cement composition 50 can have a 10-minute gel strength of from about 20 lb/100 ft$^2$ to about 300 lb/100 ft$^2$, alternatively from about 30 lb/100 ft$^2$ to about 250 lb/100 ft$^2$, alternatively from about 50 lb/100 ft$^2$ to about 220 lb/100 ft$^2$, alternatively from about 70 lb/100 ft$^2$ to about 220 lb/100 ft$^2$, or alternatively from about 100 lb/100 ft$^2$ to about 200 lb/100 ft$^2$, when measured in accordance with test standard API-RP-10B-2. The thixotropic cement composition 50 can have a 10-minute gel strength in a range of from about 20 lb/100 ft$^2$ to about 300 lb/100 ft$^2$, when measured in accordance with test standard API-RP-10B-2.

In embodiments, the thixotropic cement composition 50 has a 10-minute gel strength of greater than or equal to about 30% of a 10-minute gel strength of a reference composition, alternatively greater than or equal to about 60%, alternatively greater than or equal to about 70%, or alternatively greater than or equal to about 80%, when measured in accordance with test standard API-RP-10B-2, wherein the reference composition does not include added graphene oxide 30 and is otherwise identical to the thixotropic cement composition. In embodiments, the thixotropic cement composition 50 has a 10-minute gel strength and a 10-second gel strength, at a temperature, wherein the 10-minute gel strength at the temperature is greater than twice greater than twice (e.g., at least or about 2 times, 2.5 times, 3 times) of the 10-second gel strength at the temperature, alternatively greater than 2.5 times, alternatively greater than 3 times, or alternatively greater than 4 times of the 10-second gel strength at the temperature, when measured in accordance with test standard API-RP-10B-2. In embodiments, the 10-second gel strength and/or the 10-minute gel strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In embodiments, the 10-second gel strength and/or the 10-minute gel strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

In embodiments, the thixotropic cement composition 50 has a thickening time. The thickening time herein refers to the time required for the thixotropic cement composition 50 to achieve 70 Bearden units of Consistency (Bc) after preparation of the thixotropic cement composition 50. At about 70 Bc, the thixotropic cement composition 50 undergoes a conversion from a pumpable fluid state to a non-pumpable gel. In order to keep the thixotropic cement composition 50 in a pumpable state for an appropriate amount of time, additives such as retarders and accelerators can be added to modulate the pump time by shortening or extending the thickening time. A measurement of Bc can be considered a thickening time test which is performed on a moving fluid. In a thickening time test, an apparatus including a pressurized consistometer can apply temperature and pressure to a slurry (e.g., the thixotropic cement composition 50) while the slurry is being stirred by a paddle. A resistor arm and potentiometer coupled to the paddle can provide an output in units of Bc. Thickening time can be measured in accordance with test standard API-RP-10B-2.

In embodiments, at about 3,000 psi, the thixotropic cement composition has a thickening time to achieve about 70 Bc ranging from about 1 hours to about 15 hours, alternatively from about 2 hours to about 12 hours, alternatively from about 3 hours to about 12 hours, alternatively from about 4 hours to about 12 hours, or alternatively from about 5 hours to about 12 hours, when measured in accordance with test standard API-RP-10B-2.

Compressive strength is generally the capacity of a material or structure to withstand axially directed compression forces. The compressive strength of a composition can be measured at a specified time (e.g., 24 hours) after a cement blend has been mixed with water and the resultant cement slurry is maintained under specified temperature and pressure conditions to form a hardened, set cement. For example, compressive strength can be measured at a time in the range of from about 12 to about 48 hours (or longer) after the cement slurry is mixed, and the cement slurry is maintained typically at a temperature of from 0° C./32° F. to about 204° C./400° F. and a suitable pressure, during which time the cement slurry can set into a hardened mass. Compressive strength can be measured by either a destructive method or non-destructive method. The destructive method physically tests the strength of hardened samples at various points in time by crushing the samples in a compression-testing machine. The compressive strength is calculated from the failure load divided by the cross-sectional area resisting the load and is reported in units of pound-force per square inch (psi). Non-destructive methods can employ an ultrasonic cement analyzer (UCA). A UCA can be available from FANN® Instrument Company, Houston, TX. Compressive strengths can be determined in accordance with API RP 10B-2, *Recommended Practice for Testing Well Cements*, First Edition, July 2005. Sonic strength is a measure of compressive strength based on "transit time" of soundwaves through the cement. The sonic strength is an indicator of crush compressive strength and is often used to monitor compressive strength versus time.

The thixotropic cement composition 50 can have a compressive strength evaluated by noting the time for the thixotropic cement composition to reach 100 psi compressive strength (also referred to as "time to reach 100 psi") as measured in an ultrasonic cement analyzer (UCA) test in accordance with test standard API-RP-10B-2. The time to reach 100 psi under static conditions in a UCA can be used as an estimation of the wait on cement time of a composition. At about 3,000 psi, the thixotropic cement composition 50 can have a time to reach 100 psi of from about 1 hours to about 25 hours, alternatively from about 2 hours to about 22 hours, alternatively from about 3 hours to about 22 hours, alternatively from about 4 hours to about 20 hours, alternatively from about 4 hours to about 16 hours, alternatively from about 4 hours to about 12 hours, or alternatively from about 5 hours to about 12 hours, when measured in a UCA in accordance with test standard API-RP-10B-2. In embodiments, the thixotropic cement composition 50 has a 24-hour compressive strength (also referred to as "24-hour crush strength" or "24-hour crush compressive strength") measured in accordance with test standard API-RP-10B-2. The time is 24-hour period after preparation of the thixotropic cement composition 50. At about 3,000 psi, the 24-hour compressive strength can be in a range of from about 50 psi to about 4,000 psi, alternatively from about 50 psi to about 3000 psi, alternatively from about 100 psi to about 3000 psi, alternatively from about 200 psi to about 3000 psi, or alternatively from about 300 psi to about 2800 psi, when measured in a UCA in accordance with test standard API-RP-10B-2. In embodiments, the time to reach 100 psi compressive strength and/or the 24-hour compressive strength described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In embodiments, the time to reach 100 psi compressive strength and/or the 24-hour compressive strength described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

Plastic viscosity is the viscosity when extrapolated to infinite shear rate, e.g., the slope of the shear stress/shear rate line above yield point. The yield point refers to the resistance of a fluid to initial flow, or represents the stress required to start fluid movement. The thixotropic cement composition 50 disclosed herein can have any suitable plastic viscosity and yield point. At pressures ranging from about atmospheric to about 40,000 psi, the thixotropic cement composition 50 can have a plastic viscosity of from about 20 cP to about 1000 cP, alternatively from about 20 cP to about 900 cP, or alternatively from about 20 cP to about 800 cP. At pressures ranging from about atmospheric to about 40,000 psi, the thixotropic cement composition 50 can have a yield point of from about 1 $lb_f/100$ $ft^2$ to about 100 $lb_f/100$ $ft^2$, alternatively from about 2 $lb_f/100$ $ft^2$ to about 90 $lb_f/100$ $ft^2$, alternatively from about 3 $lb_f/100$ $ft^2$ to about 80 $lb_f/100$ $ft^2$, or alternatively from about 5 $lb_f/100$ $ft^2$ to about 70 $lb_f/100$ ft². The plastic viscosity and yield point can be calculated using Bingham Plastic model. In embodiments, the plastic viscosity and/or the yield point described herein correspond to one or more temperatures in a range of from about 30° F. to about 500° F., alternatively in a range of from about 50° F. to about 400° F., alternatively in a range of from about 80° F. to about 250° F., alternatively in a range of from about 80° F. to about 200° F., or alternatively in a range of from about 80° F. to about 190° F. In embodiments, the plastic viscosity and/or yield point described herein correspond to all temperatures spanning a range of from about 30° F. to about 500° F., alternatively spanning a range of from about 50° F. to about 400° F., alternatively spanning a range of from about 80° F. to about 250° F., alternatively spanning a range of from about 80° F. to about 200° F., or alternatively spanning a range of from about 80° F. to about 190° F.

For a given composition density and/or operating temperature (e.g., a range of bottomhole circulating temperatures associated with a given wellbore service), concentration of the various components of the thixotropic cement composition 50 can be varied within the ranges disclosed herein to provide one or more of the parameters selected from (i) a rheology dial reading meeting the values disclosed herein, (ii) a 10-second gel strength meeting the values disclosed herein, (iii) a 10-minute gel strength meeting the values disclosed herein, (iv) a thickening time meeting the values disclosed herein, (v) a 100 psi compressive strength meeting the values disclosed herein, (vi) a 24-hour compressive strength meeting the values disclosed herein, (vii) a plastic viscosity meeting the values disclosed herein, (viii) a yield point meeting the values disclosed herein, or (ix) any combination of (i) to (viii).

The thixotropic cement composition 50 disclosed herein can have any suitable density. In embodiments, the density of the thixotropic cement composition 50 ranges from about 7 pounds per gallon (lb/gal) to about 25 lb/gal, alternatively from about 8 lb/gal to about 23 lb/gal, alternatively from about 9 lb/gal to about 22 lb/gal, or alternatively from about 10 lb/gal to about 22 lb/gal.

A thixotropic cement composition 50 of the type disclosed herein can be prepared using any suitable method, such as batch mixing or continuous mixing. In one or more embodiments, the method comprises mixing components (e.g., the cementitious material 10, the silica fume 20, the added graphene oxide 30, and the aqueous fluid 40) of the thixotropic cement composition 50 using mixing equipment (e.g., a jet mixer, re-circulating mixer, a batch mixer, a blender, a mixing head of a solid feeding system) to form a pumpable fluid. For example, all components of the thixotropic cement composition 50 can be added to a batch mixer and agitated until the desired amount of mixing is achieved. Alternatively, the thixotropic cement composition 50 can be added to a continuous mixer where components are metered into the mixer and a product of the thixotropic cement composition 50 is continuously withdrawn.

After preparation, if the thixotropic cement composition 50 can be transported to and/or stored at the wellsite, the transportation and/or storage vessel can have an agitator, rotor, mixer, or the like to impart sufficient shear to the thixotropic cement composition 50 to maintain a flowable, pumpable composition (e.g., a slurry).

Figure 5:
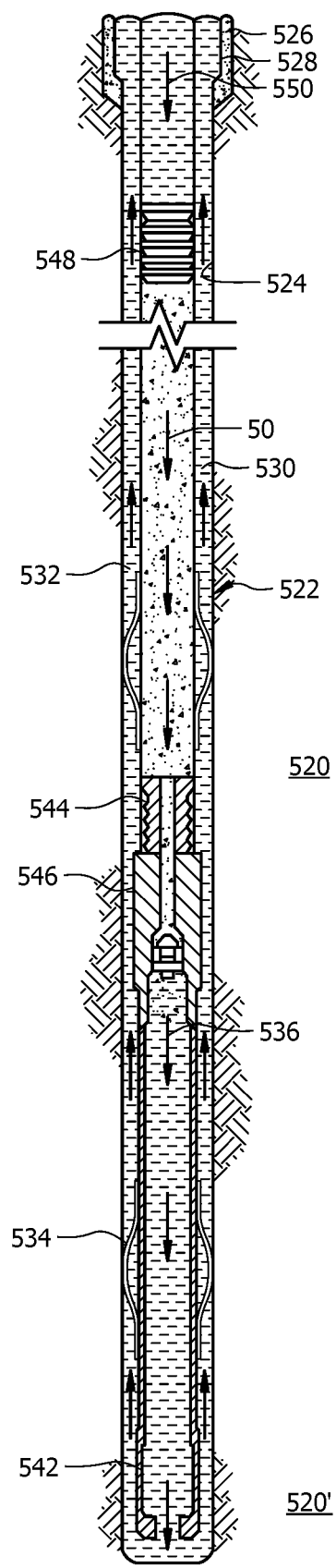
FIG. 5 is a schematic of the placement of a cementitious composition into a subterranean formation, according to embodiments of the disclosure.

In embodiments, the thixotropic cement composition 50 is used for servicing a wellbore 522 penetrating a subterranean formation 520 (FIG. 5, discussed in more detail hereinbelow). The wellbore can have a Bottomhole Circulating Temperature (BHCT) of from about 30° F. to about 500° F., alternatively from about 50° F. to about 500° F., alternatively from about 50° F. to about 450° F., alternatively from about 50° F. to about 400° F., alternatively from about 80° F. to about 250° F., alternatively from about 50° F. to about 200° F., alternatively from about 80° F. to about 200° F., or alternatively from about 80° F. to about 190° F. In embodiments, the wellbore has a Bottomhole Static Temperature (BHST) of from about 30° F. to about 500° F., alternatively from about 50° F. to about 500° F., alternatively from about 50° F. to about 450° F., alternatively from about 50° F. to about 400° F., alternatively from about 80° F. to about 250° F., alternatively from about 50° F. to about 200° F., alternatively from about 80° F. to about 200° F., or alternatively from about 80° F. to about 190° F.

Also provided herein is a method of servicing a wellbore utilizing the thixotropic cement composition 50 of this disclosure. With reference to FIG. 2, a method 100 of servicing a wellbore penetrating a subterranean formation according to this disclosure comprises introducing a thixotropic cement composition 50 of this disclosure downhole, as indicated at 120. The method can, in embodiments, further include determining if silica fume 20 comprises a sufficient amount of naturally-occurring graphene oxide 30', as indicated at 105, forming the thixotropic cement composition 50, as indicated at 110, allowing the thixotropic cement composition 50 to set, as indicated at 130, or a combination thereof.

As noted hereinabove, a method 100 of this disclosure can, in embodiments, comprise, as indicated at 105, determining if the silica fume 20 comprises a sufficient amount (e.g., percent graphene oxide by weight of cement (% bwoc)) of natural-occurring graphene oxide 30' (e.g., determining if the amount Y of graphene oxide 30' in the silica fume 20 is such that the thixotropic cement composition 50 formed at 110 comprises a total amount of graphene oxide $A_{G.O., TOT}$ less than or equal to the about 0.1, 0.2, 0.3, 0.4, 0.5, 0.6, 0.7, 0.8, 0.9, 1.0, 2.0, 3.0, 4.0, 5.0, 6.7, 7.0, or 8.0 percent graphene oxide by weight of cement (% bwoc), in which case, the silica fume 20 does not contain a sufficient amount of naturally-occurring graphene oxide 30'). Determining if the amount of graphene oxide in the silica fume is such that the thixotropic cement composition 50 comprises less than or equal to the about 0.1, 0.2, 0.3, 0.4, 0.5, 0.6, 0.7, 0.8, 0.9, 1.0, 2.0, 3.0, 4.0, 5.0, 6.7, 7.0, or 8.0 percent graphene oxide by weight of cement (% bwoc) can be effected by measuring a rheological parameter of the thixotropic cement composition without the added graphene oxide, and comparing the rheological parameter with a minimum or maximum value thereof. By way of non-limiting examples, the rheological parameter can comprise rheology at 3, 6, 100, 200 or 300 rpm, a 10-second gel strength, a 10-minute gel strength, or a combination thereof. Determining if the amount Y of graphene oxide 30' in the silica fume 20 is such that the thixotropic cement composition 50 comprises less than or equal to the about 0.1, 0.2, 0.3, 0.4, 0.5, 0.6, 0.7, 0.8, 0.9, 1.0, 2.0, 3.0, 4.0, 5.0, 6.7, 7.0, or 8.0 percent total graphene oxide $A_{G.O., TOT}$ by weight of cement (% bwoc) can alternatively or additionally further include performing Raman spectroscopy on a sample of the thixotropic cement composition absent the added graphene oxide 30, and examining G- and/or D-bands of the Raman spectrum obtained via the Raman spectroscopy. The G- and/or D-bands of the Raman spectrum can be utilized to determine or estimate the presence and/or amount of naturally-occurring graphene oxide 30' in the silica fume 20.

Should the determination at 105 indicate that the amount Y of graphene oxide 30' in the silica fume 20 is such that the thixotropic cement composition 50 formed at 110 (described hereinbelow) comprises less than or equal to the about 0.1, 0.2, 0.3, 0.4, 0.5, 0.6, 0.7, 0.8, 0.9, 1.0, 2.0, 3.0, 4.0, 5.0, 6.7, 7.0, or 8.0 percent total graphene oxide $A_{G.O., TOT}$ by weight of cement (% bwoc), an amount X of added graphene oxide 30 can be adjusted (e.g., added or increased) such that the thixotropic cement composition 50 formed at 110 comprises greater than or equal to the about 0.1, 0.2, 0.3, 0.4, 0.5, 0.6, 0.7, 0.8, 0.9, 1.0, 2.0, 3.0, 4.0, 5.0, 6.7, 7.0, or 8.0 percent total graphene oxide $A_{G.O., TOT}$ by weight of cement (% bwoc).

As noted herein, a method of this disclosure comprises: forming at 110 a thixotropic cement composition 50 of this disclosure comprising a cementitious material 10, a silica fume 20 (e.g., an amorphous silica), and water 40, and, if the silica fume 20 comprises an amount Y of naturally-occurring graphene oxide 30' such that the thixotropic cement composition 50 comprises a total amount of graphene oxide $A_{G.O., TOT}$ of less than or equal to about 0.1, 0.2, 0.3, 0.4, 0.5, 0.6, 0.7, 0.8, 0.9, 1.0, 2.0, 3.0, 4.0, 5.0, 6.7, 7.0, or 8.0 percent graphene oxide by weight of cement (% bwoc), the thixotropic cement composition 50 further comprises (e.g., an amount X of) additional graphene oxide 30.

In embodiments, a method of this disclosure can further comprise: forming at 110 a thixotropic cement composition 50 of this disclosure comprising a cementitious material 10, a silica fume 20 (e.g., an amorphous silica), and water 40, and, if the silica fume 20 comprises an amount Y of naturally-occurring graphene oxide 30' such that the thixotropic cement composition 50 comprises a total amount of graphene oxide $A_{G.O., TOT}$ of less than or equal to about 0.1, 0.2, 0.3, 0.4, 0.5, 0.6, 0.7, 0.8, 0.9, 1.0, 2.0, 3.0, 4.0, 5.0, 6.7, 7.0, or 8.0 percent graphene oxide by weight of cement (% bwoc), the thixotropic cement composition 50 further comprises (e.g., an amount X of) additional graphene oxide 30.

Method 100 can comprise introducing, as indicated at 120, a thixotropic cement composition 50 downhole (e.g., proximate a location of a lost circulation zone 520'), wherein, as described hereinabove, the thixotropic cement composition 50 comprises a cementitious material 10, silica fume 20 (which silica fume 20 optionally contains naturally-occurring graphene oxide 30'), added graphene oxide 30, and an aqueous fluid (e.g., water) 40; and, as indicated at 130, allowing the thixotropic cement composition 50 to set (e.g., to provide a hardened cement). As described above, the added graphene oxide 30 is in addition to any naturally-occurring graphene oxide 30' in (e.g., inherent to, a component of) the silica fume 20. The thixotropic cement composition 50 can comprise a total amount of graphene oxide, wherein the total amount of graphene oxide comprises (i) an amount of the added graphene oxide or (ii) an amount of the added graphene oxide plus an amount of graphene oxide in the silica fume when present. For example, the thixotropic cement composition 50 can comprise a total amount of graphene oxide $A_{GO, TOT}$, and the total amount of the graphene oxide $A_{GO, TOT}$ can be greater than an amount, if any, of naturally-occurring graphene oxide 30' present in (e.g., inherent to, a component of) the silica fume 20. Thixotropic cement composition 50 can thus comprise a total amount of graphene oxide $A_{G.O., TOT}$, wherein the total amount of graphene oxide $A_{G.O., TOT}$ comprises a first amount X of graphene oxide, wherein the first amount X of graphene oxide comprises an amount of the added graphene oxide 30, plus a second amount Y of graphene oxide, wherein the second amount Y of graphene oxide comprises an amount, when present, of naturally-occurring graphene oxide 30' in the silica fume 20.

As noted hereinabove, the total amount of graphene oxide $A_{G.O., TOT}$ can be in a range of from about 0.1, 0.2, 0.3, 0.4, 0.5, 0.6, 0.7, 0.8, 0.9, or 1.0 to about 1, 2, 3, 4, or 5 percent graphene oxide by weight of cement (% bwoc). The second amount Y of graphene oxide (e.g., the graphene oxide 30' naturally-occurring in the silica fume 20) can be greater than zero, in embodiments. Alternatively, in embodiments, the second amount Y of graphene oxide (e.g., the graphene oxide 30' naturally-occurring in the silica fume 20) can be about zero, in which case the total amount of graphene oxide $A_{G.O., TOT}$ can be substantially or about equal to the first amount X of graphene oxide (e.g., the amount of added graphene oxide 30).

The silica fume 20 can comprise (e.g., provides) less than or equal to about 0.1, 0.2, 0.3, 0.4, or 0.5 percent graphene oxide by weight (e.g., of cement (% bwoc)) (e.g., as determined by rheology testing and/or via Raman spectroscopy, described hereinbelow).

As noted above, the thixotropic cement composition 50 introduced downhole at 120 can further comprise one or more additional components 25. For example, the thixotropic cement composition 50 can further comprises a polysaccharide, a clay, or both. The thixotropic cement composition 50 can comprise a polysaccharide in an amount of from about 0.001 wt. % to about 10 wt. %, from about 0.01 wt. % to about 5 wt. %, or from about 0.1 wt. % to about 2 wt. % weight percent by weight of cement (% bwoc). The polysaccharide can comprise diutan gum, welan gum, xanthan gum, guar gum, or a combination thereof. The thixotropic cement composition 50 can comprise a clay. The clay can be present in an amount of from about 0.01 wt. % to about 50 wt. %, from about 0.01 wt. % to about 25 wt. %, or from about 0.01 wt. % to about 15 wt. % percent by weight of cement (% bwoc). The clay can comprise sepiolite, montmorillonite, beidellite, nontronite, samonite, smectite, kaolinite, serpentine, illite, chlorite, saponite, fuller's earth, attapulgite, or combinations thereof or a combination thereof. By way of further example, the one or more additional components 25 can include a viscosifier.

The thixotropic cement composition 50 introduced downhole at 120 can have a 10-minute gel strength in a range of from about 10, 20, 30, 40, or 50 lb$_f$/100 ft$^2$ to about 100, 200, or 300 lb$_f$/100 ft$^2$, when measured in accordance with test standard API-RP-10B-2. In embodiments, the thixotropic cement composition 50 has a 10-minute gel strength in a range of from about 20, 30, or 50 lb$_f$/100 ft$^2$ to about 100, 200, or 300 lb$_f$/100 ft$^2$, when measured in accordance with test standard API-RP-10B-2.

The thixotropic cement composition 50 introduced downhole at 120 can have a 10-second gel strength of from about 5 lb$_f$/100 ft$^2$ to about 100 lb$_f$/100 ft$^2$, from about 5 lb$_f$/100 ft$^2$ to about 75 lb$_f$/100 ft$^2$, or from about 10 lb$_f$/100 ft$^2$ to about 65 lb$_f$/100 ft$^2$, when measured in accordance with test standard API-RP-10B-2. In embodiments, the thixotropic cement composition 50 introduced downhole at 120 has a 10-minute gel strength of greater than or equal to about 50% of a 10-minute gel strength of a reference composition, when measured in accordance with test standard API-RP-10B-2, wherein the reference composition does not include the added graphene oxide and is otherwise identical to the thixotropic cement composition. The thixotropic cement composition 50 can have, at a temperature, a 10-minute gel strength and a 10-second gel strength, wherein the 10-minute gel strength at the temperature is greater than twice the 10-second gel strength at the temperature, when measured in accordance with test standard API-RP-10B-2.

At atmospheric pressure and 3 rpm to 300 rpm, the thixotropic cement composition 50 can have a rheology dial reading in a range of from about 3 to about 300, from about 2 to about 300, or from about 5 to about 250, when measured in accordance with test standard API-RP-10B-2. For example, in embodiments, at atmospheric pressure and 3 rpm, the thixotropic cement composition 50 has a rheology dial reading in a range of from about 3 to about 50 when measured in accordance with test standard API-RP-10B-2.

The thixotropic cement composition 50 introduced downhole at 120 can have a thickening time to about 70 Bearden units of Consistency (Bc) in a range of from about 1 hours to about 15 hours at about 3,000 psi, when measured in accordance with test standard API-RP-10B-2. In embodiments, the thixotropic cement composition 50 introduced downhole at 50 has an increase in thickening time to achieve about 70 Bc and a decrease in 10-minute gel strength when compared to a reference composition, when measured in accordance with test standard API-RP-10B-2, wherein the increase is greater than or equal to about 30% and the decrease is less than or equal to about 50%, wherein the thickening time to achieve about 70 Bc is at about 3,000 psi, and wherein the reference composition does not include the added graphene oxide (and/or contains a reduced total amount $A_{G.O., TOT}$ of GO) and is otherwise identical to the thixotropic cement composition.

Introducing the thixotropic cement composition 50 downhole at 120 can comprise pumping the thixotropic cement composition 50 into the wellbore 522 (FIG. 5, described hereinbelow). The thixotropic cement composition 50 can be pumped into the wellbore 522 via a drill pipe and/or a drill bit, in embodiments. Method 100 can further comprise ceasing of the introducing the thixotropic cement composition 50 downhole at 120 before allowing the thixotropic cement composition 50 to set at 130.

In embodiments, the method is utilized in a lost circulation operation, and introducing, thixotropic cement composition 50 downhole at 120 comprises introducing the thixotropic cement composition 50 downhole proximate a location of a lost circulation zone 520' of the subterranean formation 520. In such embodiments, the set thixotropic cement composition 50 can block at least a portion of the lost circulation zone 520'. The set thixotropic cement composition 50 can thus be utilized to reduce lost circulation by reducing or preventing flow of a drilling fluid from the wellbore 522 through the lost circulation zone 520' and into the adjacent subterranean formation 520. The method can include allowing the thixotropic cement composition 50 to flow into at least a portion of a lost circulation zone 520'.

Figure 3:
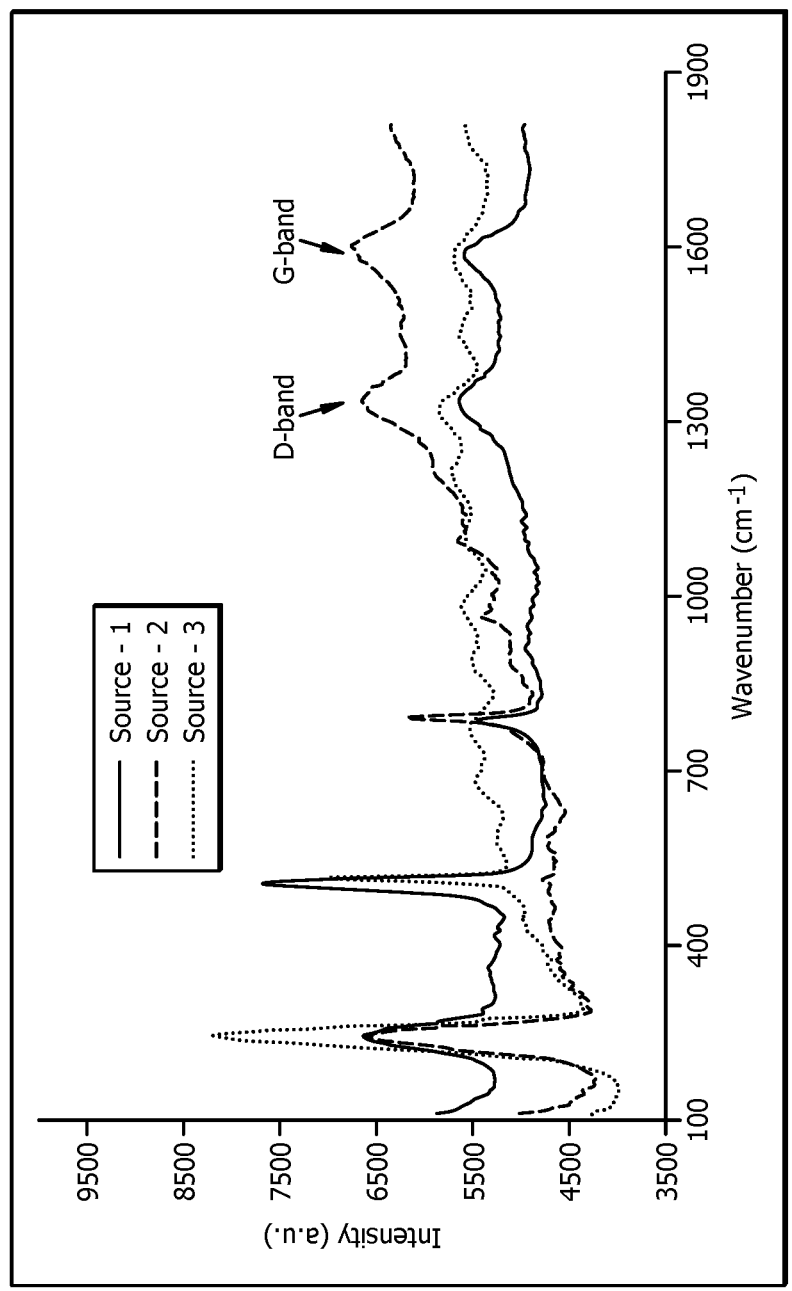
FIG. 3 depicts Raman spectra of a variety of amorphous silicas (e.g., silica fumes), according to embodiments of this disclosure.

FIG. 3 depicts representative Raman spectra obtained for the silica fume 20 Sources of the Examples described further hereinbelow. The D-band of the Raman spectrum can indicate defects in graphitic structure which can arise from out of plane vibration, while the G-band of the Raman spectrum can originate from in plane vibration of C—C bonds from sp2 orbitals, indicating graphitic structure. Prominent D- and G-band peak rises can be at 1350 $cm^{-1}$ and 1580 $cm^{-1}$, respectively. The D- and G-bands can thus indicate the presence of graphite, graphene oxide, and/or other layered carbon materials.

In embodiments, a method of this disclosure comprises: forming a thixotropic cement composition 50 as described herein, comprising a cementitious material 10, silica fume 20, aqueous fluid (e.g., water) 40, and an amount of graphene oxide $A_{G.O., TOT}$ to provide the thixotropic cement composition 50 with a sufficient or desired gel strength (e.g., a 10-minute gel strength of from about 80, 100, or 200 $lb_f/100$ $ft^2$ to about 300 $lb_f/100$ $ft^2$, when measured in accordance with test standard API-RP-10B-2). The total amount of graphene oxide $A_{G.O., TOT}$ can include a first amount X of graphene oxide 30 that is not a component of the silica fume 20, a second amount Y of graphene oxide 30' present (e.g., inherent in) in the silica fume 20, or both the first amount X and the second amount Y.

Figure 4:
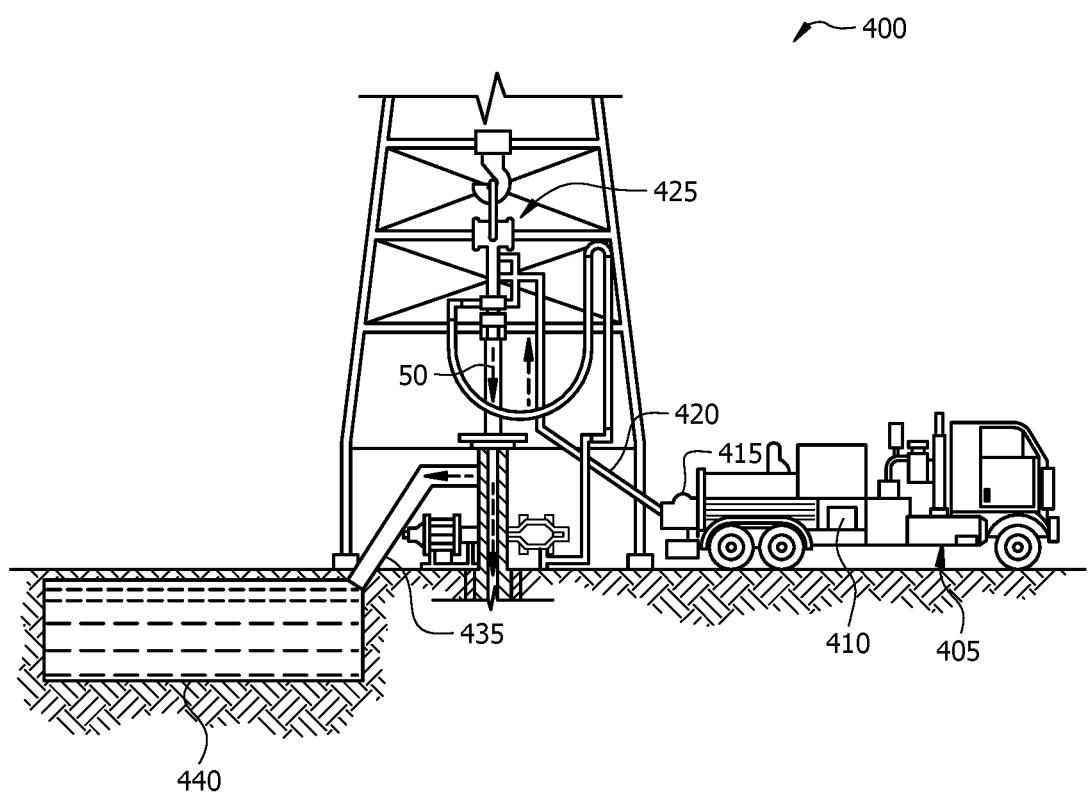
FIG. 4 is a schematic of surface equipment that can be utilized in the placement of a cementitious composition, according to embodiments disclosure.

An example cementing technique using a thixotropic cement composition 50 of this disclosure will now be described with reference to FIG. 4, which is a schematic of surface equipment 400 that can be utilized in the placement of a thixotropic cement composition 50, according to embodiments disclosure, and FIG. 5, which is a schematic of the placement of a cementitious composition into a subterranean formation 520 in accordance with embodiments of the disclosure. FIG. 4 illustrates surface equipment 400 that can be used in the placement of a thixotropic cement composition 50 in accordance with certain examples. It will be noted that while FIG. 4 generally depicts a land-based operation, those skilled in the art will readily recognize that the principles described herein are equally applicable to subsea operations that employ floating or sea-based platforms and rigs, without departing from the scope of the disclosure. As illustrated in FIG. 4, the surface equipment 400 can include a cementing unit 405, which can include one or more cement trucks. The cementing unit 405 can include mixing equipment 410 and pumping equipment 415.

Cementing unit 405, or multiple cementing units 405, can pump a thixotropic cement composition 50 of the type disclosed herein through a feed pipe 420 and to a cementing head 425 which conveys the thixotropic cement composition 50 downhole. Thixotropic cement composition 50 can displace other fluids present in the wellbore, such as drilling fluids and spacer fluids, which can exit the wellbore through an annulus and flow through pipe 435 to mud pit 440.

Referring to FIG. 5, the thixotropic cement composition 50 can be placed into a subterranean formation 520 in accordance with example embodiments. As illustrated, a wellbore 522 can be drilled into the subterranean formation 520. While wellbore 522 is shown extending generally vertically into the subterranean formation 520, the principles described herein are also applicable to wellbores that extend at an angle through the subterranean formation 520, such as horizontal and slanted wellbores. As illustrated, the wellbore 522 comprises walls 524 of the wellbore 522. In the illustrated embodiment, a surface casing 526 has been inserted into the wellbore 522. The surface casing 526 can be cemented to the walls 524 of the wellbore 522 by cement sheath 528. In the illustrated embodiment, one or more additional conduits (e.g., intermediate casing, production casing, liners, etc.), shown here as casing 530 can also be disposed in the wellbore 522. As illustrated, there is a wellbore annulus (i.e., annular space) 532 formed between the casing 530 and the walls 524 of the wellbore 522 and/or the surface casing 526. One or more centralizers 534 can be attached to the casing 530, for example, to centralize the casing 530 in the wellbore 522 prior to and during the cementing operation.

With continued reference to FIG. 5, the thixotropic cement composition 50 can be placed (e.g., pumped) down the interior of the casing 530. The thixotropic cement composition 50 can be allowed to flow down the interior of the casing 530 through the casing shoe 542 at the bottom of the casing 530 and up around the casing 530 into the wellbore annulus 532. The thixotropic cement composition 50 can be allowed to set in the wellbore annulus 32, for example, to form a cement sheath that supports and positions the casing 530 in the wellbore 522. Other techniques can also be utilized for introduction of the thixotropic cement composition 50. By way of example, reverse circulation techniques can be used that includes introducing the thixotropic cement composition 50 into the subterranean formation 520 by way of the wellbore annulus 532 instead of through the casing 530. In such embodiments, the method can comprise circulating the thixotropic cement composition 50 down through the wellbore annulus 532 and back up through the interior of the casing 530.

In embodiments, the thixotropic cement composition 50 displaces other fluids 536, such as drilling fluids and/or spacer fluids that can be present in the interior of the casing 530 and/or the wellbore annulus 532. At least a portion of the displaced fluids 536 can exit the wellbore annulus 532 via a flow line and be deposited, for example, in one or more retention pits (e.g., a mud pit 440 in FIG. 4). A bottom plug 544 can be introduced into the wellbore 522 ahead of the thixotropic cement composition 50, for example, to separate the thixotropic cement composition 50 from the fluids 536 that can be inside the casing 530 prior to cementing. After the bottom plug 544 reaches the landing collar 546, a diaphragm or other suitable device can rupture to allow the thixotropic cement composition 50 through the bottom plug 544. In FIG. 5, the bottom plug 544 is shown on the landing collar 546. In the illustrated embodiment, a top plug 548 can be introduced into the wellbore 522 behind the thixotropic cement composition 50. The top plug 548 can separate the thixotropic cement composition 50 from a displacement fluid 550 and also push the thixotropic cement composition 50 through the bottom plug 544.

In embodiments, the method disclosed herein further comprises circulating the thixotropic cement composition 50 down through a conduit (e.g., casing) and back up through an annular space (also referred to as an annulus or a wellbore annulus) between an outside wall of the conduit and a wall of the wellbore. In some other embodiments, the method disclosed herein further comprises circulating the thixotropic cement composition 50 down through an annular space between an outside wall of a conduit and a wall of the wellbore and back up through the conduit. The method can further comprise allowing at least a portion of the thixotropic cement composition 50 to set.

A method of servicing a wellbore 522 penetrating a subterranean formation 520 can comprise placing a thixotropic cement composition 50 of the type disclosed herein into the wellbore 522, and allowing at least a portion of the thixotropic cement composition 50 to set. The wellbore can have a conduit 530 (e.g., casing, production tubing, tubular, or other mechanical conveyance, etc.) disposed therein to form an annular space 532 between a wellbore wall 524 and an outer surface of the conduit. In embodiments, the method comprises placing a thixotropic cement composition 50 of the type disclosed herein into at least a portion of the annular space 532, and allowing at least a portion of the thixotropic cement composition 50 to set.

In embodiments of the method disclosed herein, placing thixotropic cement composition 50 into at least a portion of the annular space 532 can be in different directions. In some embodiments, placing the thixotropic cement composition 50 comprises circulating the thixotropic cement composition 50 down through the conduit 520 and back up through the annular space 532. In embodiments, placing the thixotropic cement composition 50 comprises circulating the thixotropic cement composition 50 down through the annular space 532 and back up through the conduit 530. In embodiments, the conduit 530 comprises casing.

In embodiments, a method of this disclosure can comprise introducing a thixotropic cement composition 50 of the type disclosed herein proximate the location of a lost circulation zone 520' in the wellbore 522. As previously mentioned, lost circulation zones are often encountered in a wellbore 522. A lost circulation zone 520' can comprise a depleted zone, a zone of relatively low pressure, a zone having naturally-occurring fractures, a weak zone having fracture gradients exceeded by the hydrostatic pressure of the drilling fluid, or combinations thereof. The lost circulation zone can be in an uncased portion of the wellbore 522, such as a zone having naturally-occurring fractures. The lost circulation zone 520' can comprise flow paths between the wellbore 522 and the subterranean formation 520, where fluids can flow from the wellbore 522 to the subterranean formation 520 or in a reverse direction.

Service provided by a wellbore servicing fluid in the lost circulation zone 520' can be more difficult to achieve. In one scenario, a drilling fluid may be lost to the formation, resulting in the circulation of the drilling fluid in the wellbore being too low to allow for further drilling of the wellbore. The thixotropic cement composition 50 can be used to seal the lost circulation zones 520' to prevent the uncontrolled flow of fluids into or out of the lost circulation zones 520', e.g., lost drilling fluid circulation, crossflows, underground blow-outs and the like.

In applications, a secondary cement/sealant composition may be lost to the formation as it is being placed in the wellbore, thereby rendering the secondary operation ineffective in maintaining isolation of the formation 520. In addition to drilling fluids, embodiments of the present disclosure may also be used to control lost circulation problems encountered with other fluids, for example, spacer fluids, completion fluids (e.g., completion brines), fracturing fluids, and cement compositions that may be placed into a wellbore 522.

In embodiments, a method of servicing a wellbore penetrating a subterranean formation comprises: drilling the wellbore 522 with a drill bit connected to a drill pipe, determining a location of a lost circulation zone 520' in the wellbore 522, and introducing a thixotropic cement composition 50 of the type disclosed herein proximate the location of the lost circulation zone 520'. Drilling the wellbore 522 can comprise circulating a drilling fluid via the drill pipe. In embodiments, the lost circulation zone 520' is in an uncased portion of the wellbore 522.

In embodiments, introducing the thixotropic cement composition 50 comprises pumping the thixotropic cement composition 50 into the wellbore. The thixotropic cement composition 50 can be pumped through one or more openings at the end of the string of the drill pipe. In embodiments, the thixotropic cement composition 50 can be pumped through the drill pipe and the drill bit.

The method can further comprise allowing the thixotropic cement composition 50 to flow into at least a portion of the lost circulation zone 520'. Once placed into the lost circulation zone 520', the thixotropic cement composition 50 can be allowed to set, thus a hardened mass (i.e., the set thixotropic cement composition 50) can be formed inside the lost circulation zone 520'. In embodiments, as noted hereinabove, the set thixotropic cement composition 50 blocks at least a portion of the lost circulation zone 520', for example, by forming plugs in flow paths in the lost circulation zone 520'. The set thixotropic cement composition 50 can reduce lost circulation by reducing or preventing flow of the drilling fluid from the wellbore 522 through the lost circulation zone 520' and into the adjacent subterranean formation 520, which allows for continued drilling. In embodiments, the method further comprises ceasing introducing the thixotropic cement composition 50 before allowing the thixotropic cement composition 50 to set. Upon cessation of introducing (e.g., pumping) the thixotropic cement composition 50, the thixotropic cement composition 50 can exhibit increasing gel strength to set.

In embodiments, the drilling is discontinued prior to introducing the thixotropic cement composition 50 proximate the location of the lost circulation zone 520'. In such embodiments, the method can further comprise resuming drilling of the wellbore 522 after allowing the thixotropic cement slurry 50 to set.

In embodiments, a method of servicing a wellbore 522 penetrating a subterranean formation 520 comprises: drilling the wellbore 522 with a drill bit connected to a drill pipe; determining a location of a lost circulation zone 520' in the wellbore 520, wherein the lost circulation zone 520' is in an uncased portion of the wellbore 522; introducing, via the drill pipe, a thixotropic cement composition 50 of the type disclosed herein proximate the location of the lost circulation zone 520'; allowing the thixotropic cement composition 50 to flow into at least a portion of the lost circulation zone 520'; ceasing introducing the thixotropic cement composition; 50 and allowing the thixotropic cement composition 50 to set.

In embodiments, the drilling is discontinued prior to introducing the thixotropic cement composition 50 proximate the location of the lost circulation zone 520'. The set thixotropic cement composition 50 can reduce lost circulation by reducing or preventing flow of a drilling fluid from the wellbore 522 through the lost circulation zone 520' and into the adjacent subterranean formation 520. In embodiments, the method further comprises resuming drilling of the wellbore 522 after allowing the thixotropic cement slurry 50 to set.

Various benefits may be realized by utilization of the presently disclosed methods and compositions. By incorporating added graphene 30 and/or a total amount $A_{GO,TOT}$ of graphene oxide (e.g., amount X of added graphene oxide 30 and amount Y of naturally-occurring graphene oxide 30' in silica fume 20) into the thixotropic cement composition 50 as disclosed herein, the thixotropic cement composition 50 can have a similar gel strength (e.g., 10-minute gel strength) when compared to a reference composition not containing the added graphene oxide 30 and/or containing a reduced total amount $A_{GO,TOT}$ of graphene oxide. With the described properties in rheology, gel strength, thickening time, etc., the thixotropic cement composition 50 can be used for a variety of wellbore servicing operations, e.g., to reduce lost circulation in a wellbore.

Via this disclosure, graphene oxide can be utilized in a cement composition to minimize variation in performance which can arise from differences in the quality of the available silica fume 20. Graphene oxide (e.g., naturally-occurring graphene oxide 30' in the silica fume 20 and/or added graphene oxide 30) can also improve/increase the cement compressive strength of the set cement.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

In this Example 1, different sources of silica fume were utilized to make thixotropic cement slurries. Analysis of the differently sourced silica fumes led to the unexpected discovery that the presence of graphene oxide has impact on the thixotropic behavior of a cement slurry comprising the silica fume.

To identify the reason behind the unexpected variation in gel strength seen with silica fume source, the silica fume samples were tested using Raman Spectroscopy. From the testing, it was discovered that silica fume material comprising graphene oxide exhibited greater gel strength build up than cement slurries produced with silica fume not containing (or containing less of) the graphene oxide. To confirm this, a thixotropic cement slurry with silica fume (that did not comprise graphene oxide) was compared with a thixotropic cement slurries formed using silica fume comprising graphene oxide. The latter, which are cement slurries of this disclosure, exhibited increased gel strength relative to the comparative cement slurry without graphene oxide.

Three different sources of silica fume (Source 1, Source 2, and Source 3) were tested in a 10 pound per gallon (lb/gal) thixotropic cement composition design. The Design 1 Formulation is provided in Table 1.

TABLE 1

Thixotropic Slurry at 10 lb/gal

| Components | Design 1 Formulation |
|---|---|
| Class G Cement (g) | 100.0 |
| Blend* (g) | 50 |
| Water (g) | 452.2 |
| D-AIR 3000L ™ anti-foaming agent (g) | 0.5 |

*Blend Comprises 83% Silica Fume, 2.1% Diutan and 14.9% Sepiolite Clay

This Design 1 Formulation was mixed with three different sources (Source 1, Source 2, and Source 3) of silica fume 20 as per API procedure and then tested for rheology and gel strength at 130° F. on a FYSA adaptor. A FANN® viscometer equipped with a FANN® Yield Stress Adapter (FYSA) was used in the measurement of rheology dial reading and gel strength. Rheology dial readings and gel strength of cement compositions of Design 1 Formulations comprising the Source 1, Source 2, or Source 3 silica fume were measured in accordance with test standard API-RP-10B-2. The results are given in Table 2. Source 1 comprised silica fume available from Norchem; Source 2 comprises silica fume available from Wuhan; Source 3 comprised silica fume available from Banfam.

TABLE 2

Rheology and Gel Strength Obtained with Various Silica Fumes

| | Silica Fume Source | | |
|---|---|---|---|
| | TCC 1 Comprising Source 1 | TCC 2 Comprising Source 2 | Comparative Slurry Comprising Source 3 |
| 300 rpm | 17 | 16 | 16 |
| 200 rpm | 12 | 11 | 12 |
| 100 rpm | 9 | 8 | 9 |

TABLE 2-continued

Rheology and Gel Strength Obtained with Various Silica Fumes

| | Silica Fume Source | | |
|---|---|---|---|
| | TCC 1 Comprising Source 1 | TCC 2 Comprising Source 2 | Comparative Slurry Comprising Source 3 |
| 6 rpm | 7 | 6 | 5 |
| 3 rpm | 7 | 5 | 4 |
| 10 sec gel strength (lb/100 ft²) | 20 | 15 | 8 |
| 10 min gel strength (lb/100 ft²) | 128 | 122 | 47 |
| 30 min gel strength (lb/100 ft²) | 206 | 193 | 63 |

TCC 1 was a thixotropic cement composition 50 of this disclosure comprising Source 1 silica fume; TCC 2 was a thixotropic cement composition 50 of this disclosure comprising Source 2 silica fume, and the Comparative Slurry was a cement composition comprising Source 3 silica fume. As can be seen in Table 2, the Comparative Slurry comprising Source-3 silica fume shows significantly lower gel strength build up compared to TCC 1 and TCC 2 created with Source 1 and Source 2 silica fumes, respectively. To investigate why the Comparative Slurry comprising the Source-3 silica fume exhibited significantly lower gel strength build up compared to those obtained with Source 1 and Source 2, the three samples were further tested for chemical differences using Raman spectroscopy.

The Raman Spectra for the cement compositions formed with the three different silica fumes 20 (e.g., Source 1, Source 2, and Source 3) are depicted in FIG. 3. The peaks at around 1300 and 1600 in FIG. 3, indicate the presence of naturally-occurring graphene oxide 30' in the silica fume 20 from Source 1 and Source 2, whereas these peaks are absent in the Raman spectrum obtained for the Comparative Slurry comprising the Source 3 silica fume, indicating a lack of naturally-occurring graphene oxide 30' in the Source 3 material. Thus, Source 1 and Source 2 silica fumes 20 provided sufficient naturally-occurring graphene oxide 30' to provide desirable gel strength parameters (e.g., a 10-minute gel strength greater than about 50, 60, 70, 80, 90, 100, 110, 120 lb/100 ft²), while the Source 3 silica fume (which did not contain sufficient naturally-occurring graphene oxide 30') resulted in the Comparative Cement Slurry not exhibiting (as) desirable gel strength.

Example 2

To further investigate the impact of graphene oxide, another experiment was carried out in this Example 2 using TCCs of this disclosure comprising a Design 2 cement Formulation with graphene oxide, the compositions of which are detailed in Table 3.

TABLE 3

Thixotropic Slurry at 10 lb/gal

| Components | Design 2 Formulation |
|---|---|
| Class G Cement (g) | 100.0 |
| Blend* (g) | 50 |

TABLE 3-continued

Thixotropic Slurry at 10 lb/gal

| Components | Design 2 Formulation |
|---|---|
| Water (g) | 452.2 |
| D-AIR 3000L ™ anti-foaming agent (g) | 0.5 |
| Graphene Oxide (g) | Varied (see Table 4) |

*Blend Comprises 83% Silica Fume, 2.1% Diutan and 14.9% Sepiolite Clay

An amount of 0.4 and 0.8% bwoc graphene oxide was added with Source 3 silica fume to provide thixotropic cement compositions 50 of this disclosure TCC 3 and TCC 4, whereas in another experiment 0.8% bwoc of graphene oxide was added with Source 2 silica fume to form TCC 5. The rheology and gel strength results for TCC 3, TCC 4, and TCC 5 of these experiments are tabulated in Table 4. From Table 4, it is evident that addition of graphene oxide 30 increases the gel strength when added with Source 3 silica fume which lacked sufficient naturally-occurring graphene oxide 30'. It is also evident that, with the Source 2 silica fume, which contained sufficient naturally-occurring graphene oxide 30', the additional graphene oxide 30 did not have as much impact on gel strength as when the silica fume did not contain naturally-occurring graphene oxide (as was the case for the Source 3 silica fume).

TABLE 4

Rheology and Gel Strength of TCCs Comprising Graphene Oxide

| | Silica Fume Source | | |
|---|---|---|---|
| | TCC 3 Comprising Source 3 Silica Fume | TCC 4 Comprising Source 3 Silica Fume | TCC 5 Comprising Source 2 Silica Fume |
| Added Graphene Oxide, % bwoc | 0.4 | 0.8 | 0.8 |
| 300 rpm | 21 | 21 | 19 |
| 200 rpm | 16 | 17 | 15 |
| 100 rpm | 12 | 12 | 10 |
| 6 rpm | 9 | 9 | 8 |
| 3 rpm | 8 | 8 | 7 |
| 10 sec gel strength (lb/100 ft²) | 12 | 17 | 16 |
| 10 min gel strength (lb/100 ft²) | 82 | 93 | 124 |
| 30 min gel strength (lb/100 ft²) | 128 | — | — |

The results indicate that graphene oxide 30 can be added, in a thixotropic cement composition 50 of this disclosure comprising silica fume 20 without (any or sufficient amounts of) graphene oxide (e.g., TCC 3 and TCC 4), to provide a TCC 50 that maintains a similar gel strength (e.g., 10-minute gel strength) as TCC compositions (e.g. TCC 5) formed using silica fume 20 that contains (e.g., sufficient amounts Y of) naturally-occurring graphene oxide 30'.

Figure 6:
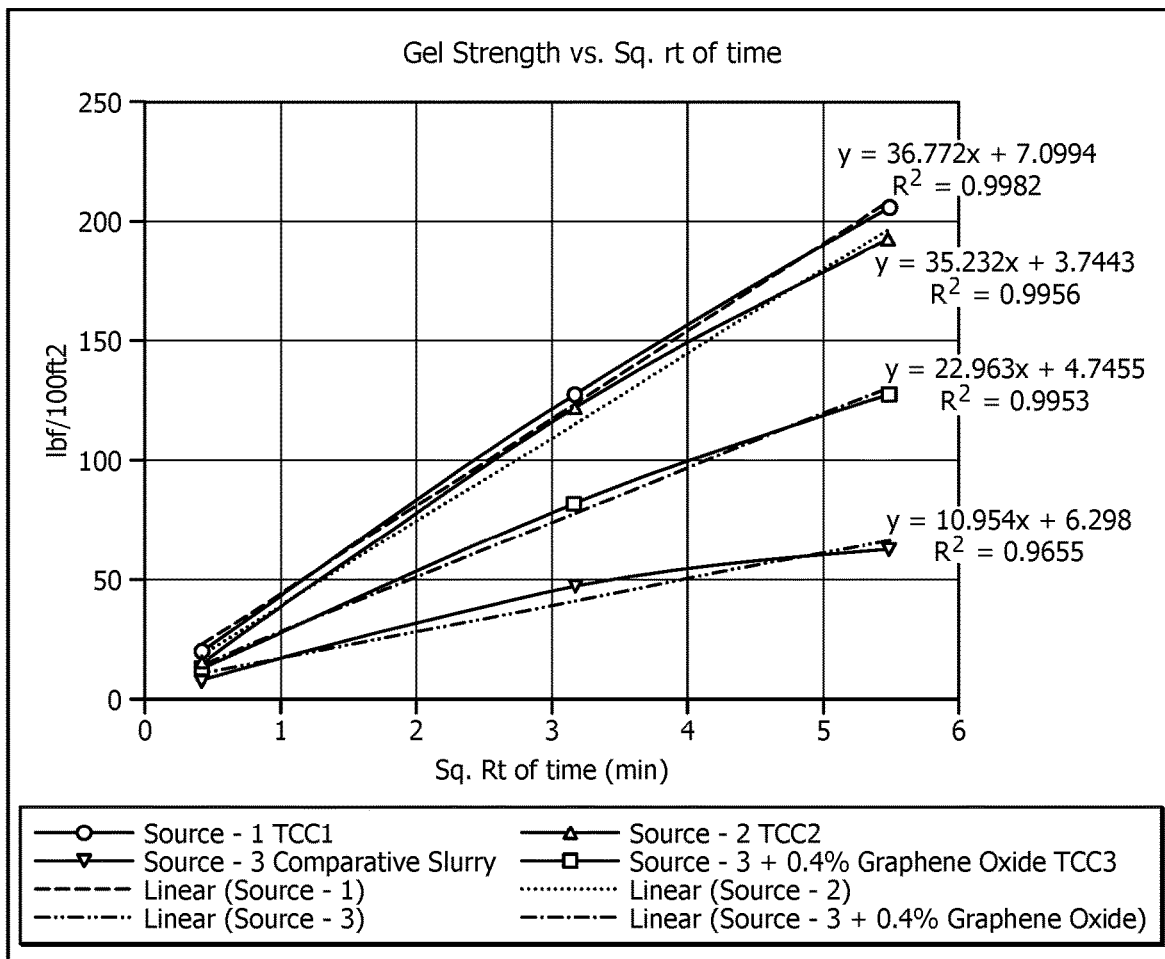
FIG. 6 is a plot of gel strength as a function of the square root of time for the thixotropic cement compositions of Example 1, according to embodiments of this disclosure.
Figure 7:
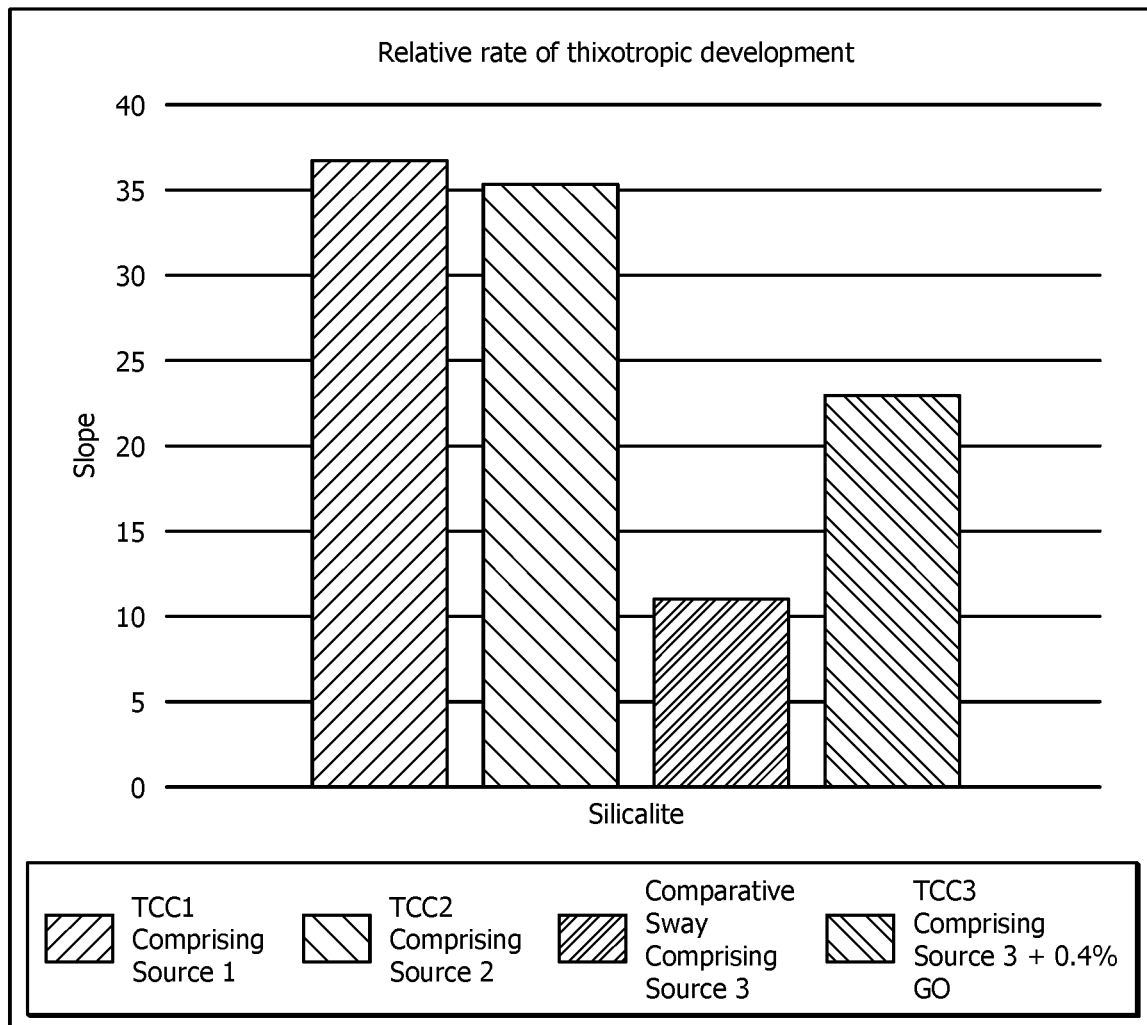
FIG. 7 is bar graph of the slopes of the best fit lines of FIG. 6.

FIG. 6 is a plot of gel strength as a function of the square root of time for the thixotropic cement compositions TCC 1, TCC 2, the Comparative Slurry, and TCC 3 of Example 1 and Example 2. FIG. 7 is bar graph of the slopes of the best fit lines of FIG. 6, showing the relative rates of thixotropic development. As is apparent in FIG. 7, adding graphene oxide 30 in TCC 3 improved the gel strength thereof over the Comparative Slurry which also comprised Source 3 silica fume 20 (absent sufficient naturally occurring graphene oxide 30'), but comprised no added graphene oxide 30. Adding graphene oxide 30 to TCC 3 improved the gel strength characteristics thereof to approach those exhibited by TCC 1 and TCC 2 which comprised Source 1 and Source 2 silica fumes 20, respectively, which Source 1 and Source 2 silica fumes 20 provided sufficient naturally-occurring graphene oxide 30' as a naturally-occurring component of the silica fume 20 itself.

Additional Disclosure

The following is provided as additional disclosure for combinations of features and embodiments of the present disclosure.

In a first embodiment, a thixotropic cement composition comprises: a cementitious material, silica fume, added graphene oxide, and an aqueous fluid, wherein the thixotropic cement composition comprises a total amount of graphene oxide, wherein the total amount of graphene oxide comprises (i) an amount of the added graphene oxide or (ii) an amount of the added graphene oxide plus an amount of graphene oxide, when present, in the silica fume.

In a second embodiment, a thixotropic cement composition comprises: a cementitious material, silica fume, added graphene oxide, and an aqueous fluid, wherein the added graphene oxide is in addition to any graphene oxide present in (e.g., inherent to, a component of) the silica fume, wherein the thixotropic cement composition comprises a total amount of graphene oxide, wherein the total amount of graphene oxide comprises a first amount of graphene oxide, wherein the first amount comprises an amount of the added graphene oxide, plus a second amount of graphene oxide, wherein the second amount comprises an amount of graphene oxide (when present) in the silica fume A third embodiment can include the thixotropic cement composition of the first or the second embodiment, wherein the total amount of graphene oxide is in a range of from about 0.1, 0.2, 0.3, 0.4, 0.5, 0.6, 0.7, 0.8, 0.9, or 1.0 to about 1, 2, 3, 4, or 5 percent by weight of cement (% bwoc).

A fourth embodiment can include the thixotropic cement composition of any one of the first to third embodiments, wherein the amount of graphene oxide in the silica fume or the second amount is not zero.

A fifth embodiment can include the thixotropic cement composition of any one of the first to fourth embodiments, wherein the silica fume comprises (e.g., provides) less than or equal to about 0.1, 0.2, 0.3, 0.4, or 0.5 percent graphene oxide (e.g., by weight of cement (% bwoc)) (e.g., as determined by rheology studies of the thixotropic cement composition absent the added graphene oxide, Raman spectroscopy, or a combination thereof).

A sixth embodiment can include the thixotropic cement composition of any one of the first to fifth embodiments further comprising a polysaccharide, a clay, or both.

A seventh embodiment can include the thixotropic cement composition of the sixth embodiment comprising the polysaccharide, wherein the polysaccharide is present in an amount of from about 0.001 to about 10, from about 0.01 to about 5, or from about 0.1 to about 2 weight percent by weight of cement (% bwoc).

An eighth embodiment can include the thixotropic cement composition of the sixth or seventh embodiment, comprising the polysaccharide, wherein the polysaccharide comprises diutan gum, welan gum, xanthan gum, guar gum, or a combination thereof.

A ninth embodiment can include the thixotropic cement composition of any one of the sixth to eighth embodiments, comprising the clay, wherein the clay is present in an amount of from about 0.01 to about 50, from about 0.01 to about 25, or from about 0.01 to about 15 percent by weight of cement (% bwoc).

A tenth embodiment can include the thixotropic cement composition of any one of the sixth to ninth embodiments, comprising the clay, wherein the clay comprises sepiolite, montmorillonite, beidellite, nontronite, samonite, smectite, kaolinite, serpentine, illite, chlorite, saponite, fuller's earth, attapulgite, or a combination thereof.

An eleventh embodiment can include the thixotropic cement composition of any one of the first to tenth embodiments further comprising a viscosifier.

A twelfth embodiment can include the thixotropic cement composition of any one of the first to eleventh embodiments, wherein the thixotropic cement composition has a 10-minute gel strength of from about 20, 100, or 200 $lb_f/100$ $ft^2$ to about 300 $lb_f/100$ $ft^2$, when measured in accordance with test standard API-RP-10B-2.

A thirteenth embodiment can include the thixotropic cement composition of any one of the first to twelfth embodiments, wherein the thixotropic cement composition has a 10-second gel strength of from about 5 $lb_f/100$ $ft^2$ to about 100 $lb_f/100$ $ft^2$, from about 5 $lb_f/100$ $ft^2$ to about 75 $lb_f/100$ $ft^2$, or from about 15 $lb_f/100$ $ft^2$ to about 65 $lb_f/100$ $ft^2$, when measured in accordance with test standard API-RP-10B-2.

A fourteenth embodiment can include the thixotropic cement composition of any one of the first to thirteenth embodiments, wherein the thixotropic cement composition has a 10-minute gel strength of greater than or equal to about 50% of a 10-minute gel strength of a reference composition, when measured in accordance with test standard API-RP-10B-2, wherein the reference composition does not include the added graphene oxide and is otherwise identical to the thixotropic cement composition.

A fifteenth embodiment can include the thixotropic cement composition of any one of the first to fourteenth embodiments, wherein the thixotropic cement composition has, at a temperature, a 10-minute gel strength and a 10-second gel strength, wherein the 10-minute gel strength at the temperature is greater than twice of the 10-second gel strength at the temperature, when measured in accordance with test standard API-RP-10B-2.

A sixteenth embodiment can include the thixotropic cement composition of any one of the first to fifteenth embodiments, wherein at atmospheric pressure and 3 rpm to 300 rpm, the thixotropic cement composition has a rheology dial reading in a range of from about 3 to about 300, from about 5 to about 200, or from about 10 to about 100, when measured in accordance with test standard API-RP-10B-2.

A seventeenth embodiment can include the thixotropic cement composition of any one of the first to sixteenth embodiments, wherein at atmospheric pressure and 3 rpm, the thixotropic cement composition has a rheology dial reading in a range of from about 3 to about 50 when measured in accordance with test standard API-RP-10B-2.

An eighteenth embodiment can include the thixotropic cement composition of any one of the first to seventeenth embodiments, wherein the thixotropic cement composition has a thickening time to about 70 Bearden units of Consistency (Bc) in a range of from about 1 hours to about 15 hours at about 3,000 psi, when measured in accordance with test standard API-RP-10B-2.

In a nineteenth embodiment a method of servicing a wellbore penetrating a subterranean formation comprises: introducing a thixotropic cement composition downhole (e.g., proximate a location of a lost circulation zone), wherein the thixotropic cement composition comprises a cementitious material, silica fume, added graphene oxide, and an aqueous fluid, wherein the added graphene oxide is in addition to any graphene oxide in (e.g., inherent to, a component of) the silica fume, wherein the thixotropic cement composition comprises a total amount of graphene oxide, and wherein the total amount of the graphene oxide is greater than an amount, if any, of graphene oxide in (e.g., inherent to, a component of) the silica fume; and allowing the thixotropic cement composition to set.

A twentieth embodiment can include the method of the nineteenth embodiment, wherein the thixotropic cement composition comprises a total amount of graphene oxide, wherein the total amount of graphene oxide comprises a first amount of graphene oxide, wherein the first amount comprises an amount of the added graphene oxide, plus a second amount of graphene oxide, wherein the second amount comprises an amount of graphene oxide in the silica fume.

A twenty first embodiment can include the method of the twentieth embodiment, wherein the total amount of graphene oxide is in a range of from about 0.1, 0.2, 0.3, 0.4, 0.5, 0.6, 0.7, 0.8, 0.9, or 1.0 to about 1, 2, 3, 4, or 5 percent graphene oxide by weight of cement (% bwoc).

A twenty second embodiment can include the method of any one of the nineteenth to twenty first embodiments, wherein the amount of graphene oxide in the silica fume is greater than zero.

A twenty third embodiment can include the method of any one of the nineteenth to twenty second embodiments, wherein the silica fume comprises (e.g., provides) less than or equal to about 0.1, 0.2, 0.3, 0.4, or 0.5 percent graphene oxide by weight (e.g., of cement (% bwoc)).

A twenty fourth embodiment can include the method of any one of the nineteenth to twenty third embodiments, wherein the thixotropic cement composition further comprises a polysaccharide, a clay, or both.

A twenty fifth embodiment can include the method of the twenty fourth embodiment, wherein the thixotropic cement composition comprises the polysaccharide, and wherein the polysaccharide is present in an amount of from about 0.001 to about 10, from about 0.01 to about 5, or from about 0.1 to about 2 weight percent by weight of cement (% bwoc).

A twenty sixth embodiment can include the method of the twenty fourth or twenty fifth embodiment, wherein the thixotropic cement composition comprises the polysaccharide, and wherein the polysaccharide comprises diutan gum, welan gum, xanthan gum, guar gum or a combination thereof.

A twenty seventh embodiment can include the method of any one of the twenty fourth to twenty sixth embodiments, wherein the thixotropic cement composition comprises the clay, and wherein the clay is present in an amount of from about 0.01 to about 50, from about 0.01 to about 25, or from about 0.01 to about 15 percent by weight of cement (% bwoc).

A twenty eighth embodiment can include the method of any one of the twenty fourth to twenty seventh embodiments, wherein the thixotropic cement composition comprises the clay, and wherein the clay comprises sepiolite, montmorillonite, beidellite, nontronite, samonite, smectite, kaolinite, serpentine, illite, chlorite, saponite, fuller's earth, attapulgite, or a combination thereof.

A twenty ninth embodiment can include the method of any one of the nineteenth to twenty eighth embodiments, wherein the thixotropic cement composition further comprises a viscosifier.

A thirtieth embodiment can include the method of any one of the nineteenth to twenty ninth embodiments, wherein the thixotropic cement composition has a 10-minute gel strength of from about 10, 20, 30, 40, or 50 lb/100 ft$^2$ to about 100, 200, or 300 lb/100 ft$^2$, when measured in accordance with test standard API-RP-10B-2.

A thirty first embodiment can include the method of the thirtieth embodiment, wherein the thixotropic cement composition has a 10-minute gel strength of from about 30, 40, or 50 lb/100 ft$^2$ to about 100, 200, or 300 lb/100 ft$^2$, when measured in accordance with test standard API-RP-10B-2.

A thirty second embodiment can include the method of any one of the nineteenth to thirty first embodiments, wherein the thixotropic cement composition has a 10-second gel strength of from about 5 lb/100 ft$^2$ to about 100 lb/100 ft$^2$, from about 5 lb/100 ft$^2$ to about 75 lb/100 ft$^2$, or from about 10 lb/100 ft$^2$ to about 65 lb/100 ft$^2$, when measured in accordance with test standard API-RP-10B-2.

A thirty third embodiment can include the method of any one of the nineteenth to thirty second embodiments, wherein the thixotropic cement composition has a 10-minute gel strength of greater than or equal to about 30, 40, or 50% of a 10-minute gel strength of a reference composition, when measured in accordance with test standard API-RP-10B-2, wherein the reference composition does not include the added graphene oxide and is otherwise identical to the thixotropic cement composition.

A thirty fourth embodiment can include the method of any one of the nineteenth to thirty third embodiments, wherein the thixotropic cement composition has, at a temperature, a 10-minute gel strength and a 10-second gel strength, wherein the 10-minute gel strength at the temperature is greater than twice of the 10-second gel strength at the temperature, when measured in accordance with test standard API-RP-10B-2.

A thirty fifth embodiment can include the method of any one of the nineteenth to thirty fourth embodiments, wherein at atmospheric pressure and 3 rpm to 300 rpm, the thixotropic cement composition has a rheology dial reading in a range of from about 3 to about 300, from about 5 to about 200, or from about 10 to about 100, when measured in accordance with test standard API-RP-10B-2.

A thirty sixth embodiment can include the method of any one of the nineteenth to thirty fifth embodiments, wherein at atmospheric pressure and 3 rpm, the thixotropic cement composition has a rheology dial reading in a range of from about 3 to about 50 when measured in accordance with test standard API-RP-10B-2.

A thirty seventh embodiment can include the method of any one of the nineteenth to thirty sixth embodiments, wherein the thixotropic cement composition has a thickening time to about 70 Bearden units of Consistency (Bc) in a range of from about 2 hours to about 15 hours at about 3,000 psi, when measured in accordance with test standard API-RP-10B-2.

A thirty eighth embodiment can include the method of any one of the nineteenth to thirty seventh embodiments, wherein introducing comprises pumping the thixotropic cement composition into the wellbore.

A thirty ninth embodiment can include the method of any one of the nineteenth to thirty eighth embodiments, wherein the thixotropic cement composition is pumped into the wellbore via a drill pipe and a drill bit.

A fortieth embodiment can include the method of any one of the nineteenth to thirty ninth embodiments, further comprising ceasing introducing the thixotropic cement composition before allowing the thixotropic cement composition to set.

A forty first embodiment can include the method of the fortieth embodiment, wherein the set thixotropic cement composition reduces lost circulation by reducing or preventing flow of a drilling fluid from the wellbore through the lost circulation zone and into the adjacent subterranean formation.

A forty second embodiment can include the method of any one of the nineteenth to forty first embodiments, wherein the set thixotropic cement composition blocks at least a portion of a lost circulation zone.

A forty third embodiment can include the method of any one of the nineteenth to forty second embodiments, further comprising allowing the thixotropic cement composition to flow into at least a portion of a lost circulation zone.

In a forty fourth embodiment, a method comprising: forming a thixotropic cement composition comprising a cementitious material, a silica fume (e.g., an amorphous silica), and water, and, if the silica fume comprises an amount of graphene oxide such that the thixotropic cement composition comprises less than or equal to about 0.1, 0.2, 0.3, 0.4, or 0.5 percent graphene oxide by weight of cement (% bwoc), additional graphene oxide.

A forty fifth embodiment can include the method of the forty fourth embodiment, further comprising determining if the amount of graphene oxide in the silica fume is such that the thixotropic cement composition comprises less than or equal to the about 0.1, 0.2, 0.3, 0.4, 0.5, 0.6, 0.7, 0.8, 0.9, 1.0, 2.0, 3.0, 4.0, 5.0, 6.7, 7.0, or 8.0 percent graphene oxide by weight of cement (% bwoc).

A forty sixth embodiment can include the method of the forty fifth embodiment, wherein determining if the amount of graphene oxide in the silica fume is such that the thixotropic cement composition comprises less than or equal to the about 0.1, 0.2, 0.3, 0.4, 0.5, 0.6, 0.7, 0.8, 0.9, 1.0, 2.0, 3.0, 4.0, 5.0, 6.7, 7.0, or 8.0 percent graphene oxide by weight of cement (% bwoc) further comprises measuring a rheological parameter of the thixotropic cement composition without the added graphene oxide.

A forty seventh embodiment can include the method of the forty sixth embodiment, wherein the rheological parameter comprises rheology at 3, 6, 100, 200 or 300 rpm, a 10-second gel strength, a 10-minute gel strength, or a combination thereof.

A forty eighth embodiment can include the method of any one of the forty fifth to forty seventh embodiments, wherein determining if the amount of graphene oxide in the silica fume is such that the thixotropic cement composition comprises less than or equal to the about 0.1, 0.2, or 0.5 percent graphene oxide by weight of cement (% bwoc) further comprises performing Raman spectroscopy on a sample of the thixotropic cement composition absent the added graphene oxide, and examining G- and/or D-bands of the Raman spectrum obtained via the Raman spectroscopy.

In a forty ninth embodiment, a method comprises: forming a thixotropic cement composition comprising a cementitious material, silica fume, water, and an amount of graphene oxide to provide the thixotropic cement composition with a 10-minute gel strength of from about 80, 100, or 200 $lb_f/100$ $ft^2$ to about 300 $lb_f/100$ $ft^2$, when measured in accordance with test standard API-RP-10B-2.

A fiftieth embodiment can include the method of the forty ninth embodiment, wherein the amount of graphene oxide comprises a first amount of graphene oxide present (e.g., inherent in) in the silica fume, a second amount of graphene oxide that is not a component of the silica fume, or both the first amount and the second amount.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of servicing a wellbore penetrating a subterranean formation, the method comprising:
preparing a thixotropic cement composition, wherein the thixotropic cement composition comprises a cementitious material, silica fume, added graphene oxide, and an aqueous fluid, wherein the silica fume comprises an amount of graphene oxide ranging from equal to or greater than 0 to equal to or less than 0.5 percent by weight, wherein the added graphene oxide is in addition to the amount of graphene oxide in the silica fume, wherein the thixotropic cement composition comprises a total amount of graphene oxide, and wherein the total amount of the graphene oxide is greater than the amount of graphene oxide in the silica fume;
wherein the preparing further comprises selecting an amount of the added graphene oxide to provide the total amount of graphene oxide such that a 10-minute gel strength of the thixotropic cement composition is greater than a 10-minute gel strength of a reference composition, wherein the 10-minute gel strengths are measured in accordance with test standard API-RP-10B-2, and wherein the reference composition does not include the added graphene oxide and is otherwise identical to the thixotropic cement composition; and introducing the thixotropic cement composition into the wellbore and allowing the thixotropic cement composition to set.

2. The method of claim 1, wherein the total amount of graphene oxide is in a range of from 0.1 to 5 percent graphene oxide by weight of cement (% bwoc).

3. The method of claim 1, wherein the amount of the graphene oxide in the silica fume is greater than zero and less than or equal to 0.5 percent by weight.

4. The method of claim 1, wherein the amount of the graphene oxide in the silica fume is equal to or greater than 0 to less than or equal to 0.4 percent graphene oxide by weight.

5. The method of claim 1, wherein the 10-minute gel strength of the thixotropic cement composition is from 10 $lb_f/100$ $ft^2$ to 300 $lb_f/100$ $ft^2$.

6. The method of claim 5, wherein the 10-minute gel strength of the thixotropic cement composition is from 30 $lb_f/100$ $ft^2$ to 300 $lb_f/100$ $ft^2$.

7. The method of claim 1, wherein the thixotropic cement composition has a 10-second gel strength of from 5 $lb_f/100$ $ft^2$ to about-100 $lb_f/100$ $ft^2$, measured in accordance with test standard API-RP-10B-2.

8. The method of claim 1, wherein the set thixotropic cement composition reduces lost circulation by reducing or preventing flow of a drilling fluid from the wellbore through a lost circulation zone and into an adjacent subterranean formation.

9. The method of claim 1, wherein the thixotropic cement composition comprises polysaccharide, and wherein the polysaccharide is present in an amount of from 0.001 to 10, from 0.01 to 5, or from 0.1 to 2 weight percent by weight of cement (% bwoc).

10. The method of claim 1, wherein the thixotropic cement composition comprises polysaccharide, and wherein the polysaccharide comprises diutan gum, welan gum, xanthan gum, guar gum or a combination thereof.

11. The method of claim 1, wherein the thixotropic cement composition comprises clay, and wherein the clay is present in an amount of from 0.01 to 50, from 0.01 to 25, or from 0.01 to 15 percent by weight of cement (% bwoc).

12. The method of claim 1, wherein the thixotropic cement composition comprises clay, and wherein the clay comprises sepiolite, montmorillonite, beidellite, nontronite, samonite, smectite, kaolinite, serpentine, illite, chlorite, saponite, fuller's earth, attapulgite, or a combination thereof.

13. The method of claim 1, wherein the 10-minute gel strength of the thixotropic cement composition is greater than or equal to 30% of the 10-minute gel strength of the reference composition.

14. The method of claim 1, wherein at atmospheric pressure and 3 rpm, the thixotropic cement composition has a rheology dial reading in a range of from 3 to 50 measured in accordance with test standard API-RP-10B-2.

15. The method of claim 1, wherein the thixotropic cement composition has a thickening time to 70 Bearden units of Consistency (Bc) in a range of from 2 hours to 15 hours at 3,000 psi, measured in accordance with test standard API-RP-10B-2.

\* \* \* \* \*